US012651122B2

(12) United States Patent
Weisz et al.

(10) Patent No.: US 12,651,122 B2
(45) Date of Patent: Jun. 9, 2026

(54) PRESERVATION OF VISUAL CONTENT ACROSS MULTI-TURN DIALOGS WITH GENERATIVE MODEL(S)

(71) Applicant: GOOGLE LLC, Mountain View, CA (US)

(72) Inventors: Ágoston Weisz, Zurich (CH); Alessandro Agostini, Zurich (CH); François-Xavier Aubet, London (GB); Khalid Salama, Zurich (CH); Trevor Strohman, Sunnyvale, CA (US); Ilia Akolzin, Zurich (CH); Petre Petrov, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 82 days.

(21) Appl. No.: 18/755,231

(22) Filed: Jun. 26, 2024

(65) Prior Publication Data

US 2026/0004071 A1    Jan. 1, 2026

(51) Int. Cl.
*G06F 40/284* (2020.01)
*G06V 20/70* (2022.01)
(52) U.S. Cl.
CPC ............ *G06F 40/284* (2020.01); *G06V 20/70* (2022.01)
(58) Field of Classification Search
USPC ...................................................... 704/1–504
See application file for complete search history.

(56) References Cited

U.S. PATENT DOCUMENTS

| 10,348,658 B2 * | 7/2019 | Rodriguez | .......... H04L 65/1093 |
| 12,132,580 B2 * | 10/2024 | Clegg | ..................... G06F 40/35 |
| 12,182,179 B1 * | 12/2024 | Aravamudan | ...... G06F 21/6218 |
| 12,205,577 B1 * | 1/2025 | Kim | .................... G10L 15/1815 |

(Continued)

FOREIGN PATENT DOCUMENTS

| DE | 102024135127 A1 * | 5/2025 | ........... G06T 15/005 |
| KR | 20190101492 A * | 8/2019 | ......... H04L 65/1069 |

(Continued)

OTHER PUBLICATIONS

"Introduction to prompt design" 7 pages.

(Continued)

*Primary Examiner* — Marcus T Riley
(74) *Attorney, Agent, or Firm* — Gray Ice Higdon

(57) ABSTRACT

Implementations relate to handling visual content across a multi-turn dialog. A user input that includes natural language content and visual content is received during the dialog. If the visual content is being received for the first time in the dialog, the visual content is processed to generate a corresponding tokenized representation of the visual content. The corresponding tokenized representation can be cached in a database in association with the dialog, or in association with a user account of a user of the user query. If the visual content is subsequently referenced in the dialog, the corresponding tokenized representation of the visual content is retrieved from the database. The corresponding tokenized representation of the visual content, corresponding tokenized representations of natural language content, and optionally other metadata can be processed, using a generative model, to generate a response responsive to the user input.

20 Claims, 12 Drawing Sheets

(56) References Cited

U.S. PATENT DOCUMENTS

| | | | | |
|---|---|---|---|---|
| 12,223,003 B2 * | 2/2025 | Adada | ................. | G06F 16/9536 |
| 12,401,835 B2 * | 8/2025 | Govindarajan | ..... | G06F 16/7837 |
| 12,444,418 B1 * | 10/2025 | Shah | ....................... | G10L 15/22 |
| 2019/0297039 A1 * | 9/2019 | Rodriguez | ............ | H04L 65/762 |
| 2024/0205174 A1 * | 6/2024 | Bailey | .................... | G06F 40/30 |
| 2025/0193462 A1 * | 6/2025 | Govindarajan | ........ | G06Q 50/01 |
| 2025/0232872 A1 * | 7/2025 | Natarajan | .............. | G16H 20/00 |
| 2026/0004071 A1 * | 1/2026 | Weisz | .................. | G06F 40/284 |

FOREIGN PATENT DOCUMENTS

| | | | | | |
|---|---|---|---|---|---|
| WO | WO-2025128236 A1 * | 6/2025 | ............ | G06T 11/60 |
| WO | WO-2025240072 A1 * | 11/2025 | ........... | G06F 16/383 |
| WO | WO-2025264203 A2 * | 12/2025 | | |

OTHER PUBLICATIONS

Qin et al., "How Good is Google Bard's Visual Understanding? An Empirical Study on Open Challenges" arXiv:2307.15016v2 [cs. CV], 7 pages, dated Aug. 30, 2023.
Han et al., "ImageBind-LLM: Multi-modality Instruction Tuning" arXiv:2309.03905v2 [cs.MM], 24 pages, dated Sep. 11, 2023.
Tian et al., "MM-Interleaved: Interleaved Image-Text Generative Modeling via Multi-modal Feature Synchronizer" arXiv:2401. 10208v1 [cs.CV], 20 pages, dated Jan. 18, 2024.

* cited by examiner

Figure 1B:
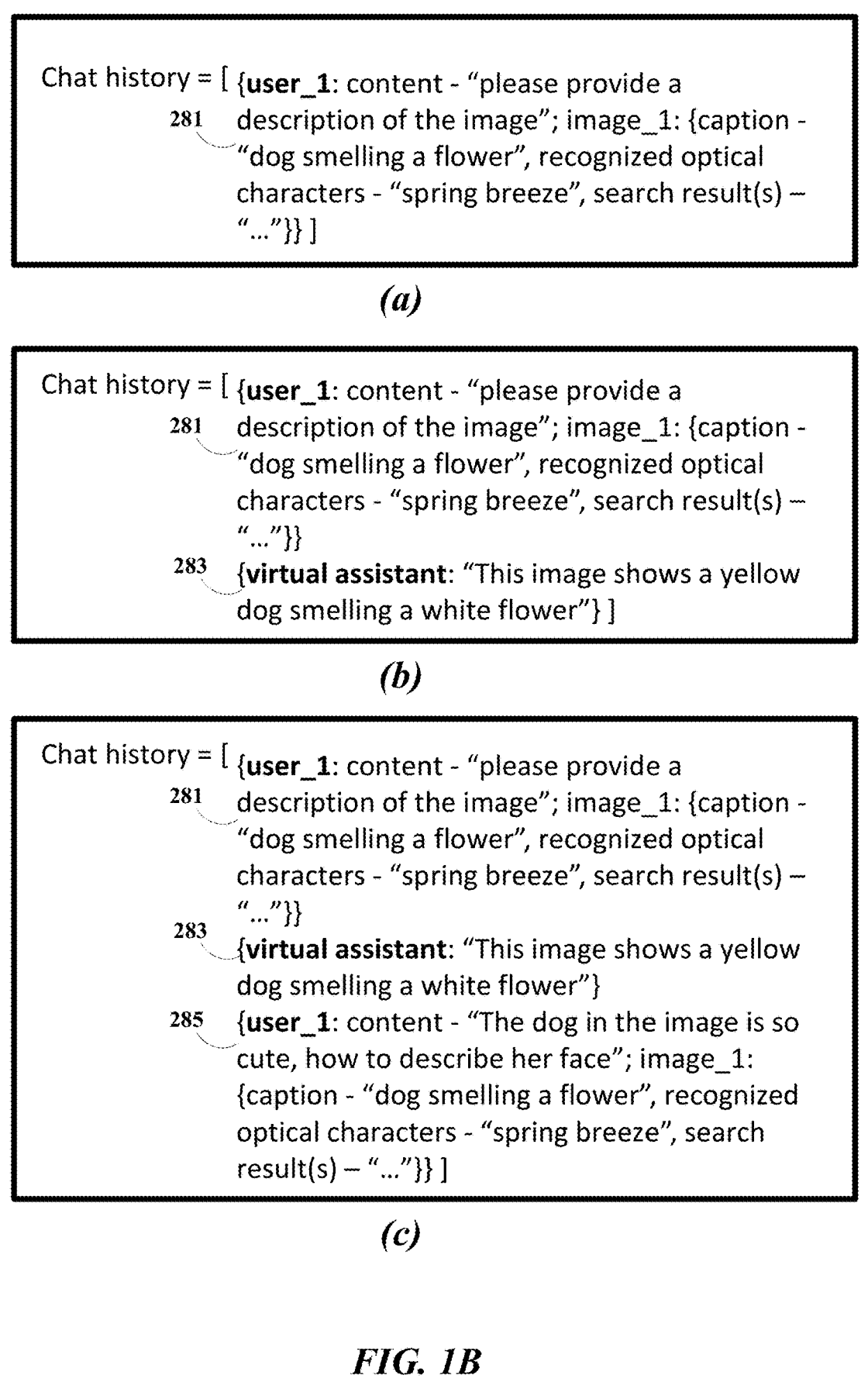

Chat history = [ {user_1: content - "please provide a
<sub>281</sub> description of the image"; image_1: {caption -
"dog smelling a flower", recognized optical
characters - "spring breeze", search result(s) –
"..."}} ]

*(a)*

Chat history = [ {user_1: content - "please provide a
<sub>281</sub> description of the image"; image_1: {caption -
"dog smelling a flower", recognized optical
characters - "spring breeze", search result(s) –
"..."}}
<sub>283</sub> {virtual assistant: "This image shows a yellow
dog smelling a white flower"} ]

*(b)*

Chat history = [ {user_1: content - "please provide a
<sub>281</sub> description of the image"; image_1: {caption -
"dog smelling a flower", recognized optical
characters - "spring breeze", search result(s) –
"..."}}
<sub>283</sub> {virtual assistant: "This image shows a yellow
dog smelling a white flower"}
<sub>285</sub> {user_1: content - "The dog in the image is so
cute, how to describe her face"; image_1:
{caption - "dog smelling a flower", recognized
optical characters - "spring breeze", search
result(s) – "..."}} ]

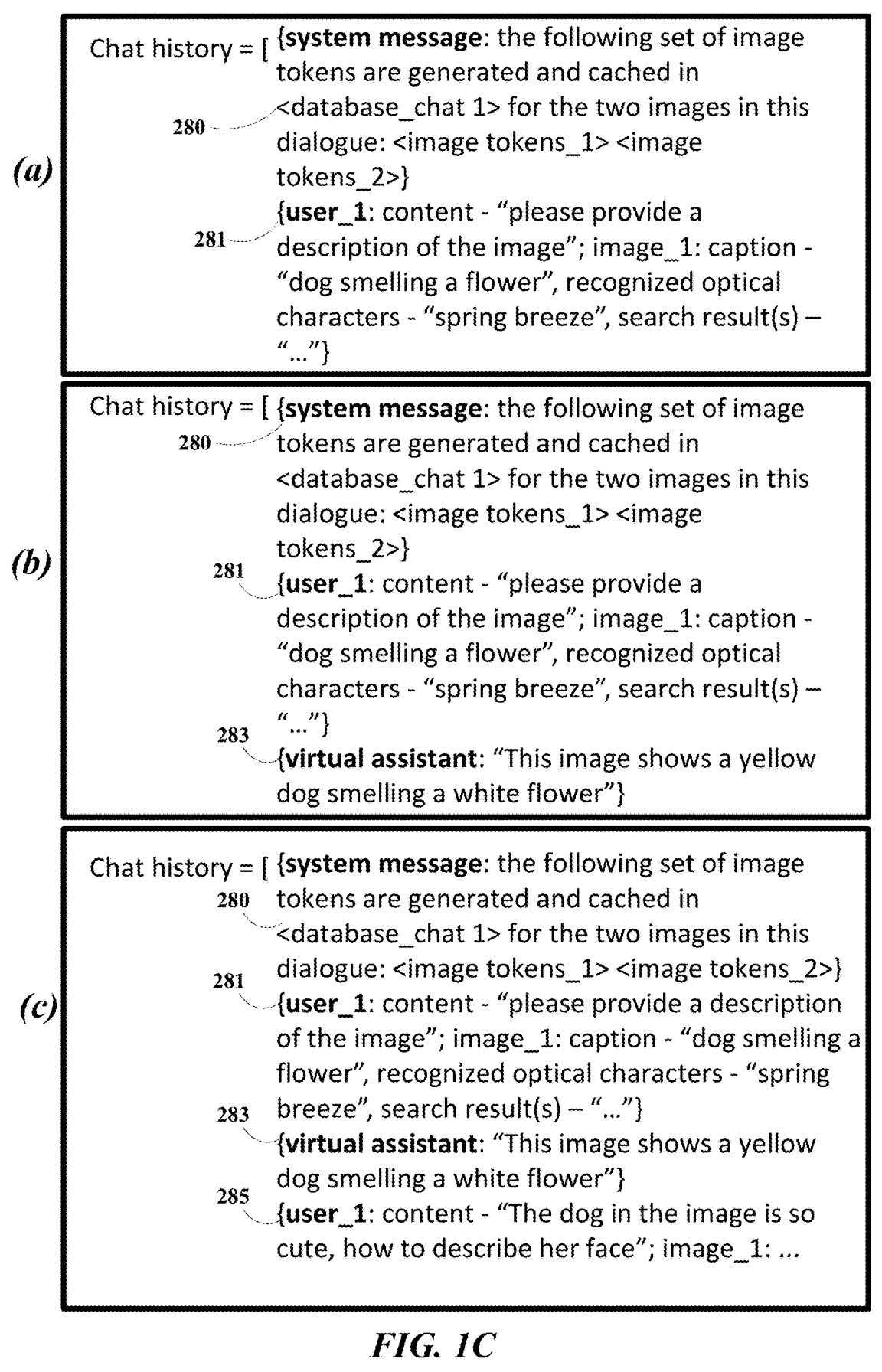

Chat history = [ {system message: the following set of image tokens are generated and cached in 280 — <database_chat 1> for the two images in this dialogue: <image tokens_1> }

281 — {user_1: content - "please provide a description of the image"; image_1: caption - "dog smelling a flower", recognized optical characters - "spring breeze", search result(s) – "..."}

*(b)*

Chat history = [ {system message: the following set of image

280 — tokens are generated and cached in <database_chat 1> for the two images in this dialogue: <image tokens_1> }

281 — {user_1: content - "please provide a description of the image"; image_1: caption - "dog smelling a flower", recognized optical characters - "spring breeze", search result(s) – "..."}

283 — {virtual assistant: "This image shows a yellow dog smelling a white flower"}

*(c)*

Chat history = [ {system message: the following set of image

280 — tokens are generated and cached in <database_chat 1> for the two images in this dialogue: <image tokens_1> }

281 — {user_1: content - "please provide a description of the image"; image_1: caption - "dog smelling a flower", recognized optical characters - "spring breeze", search result(s) – "..."}

283 — {virtual assistant: "This image shows a yellow dog smelling a white flower"}

285 — {user_1: content - "The dog in the image is so cute, how to describe her face"; image_1: ...

*FIG. 1C*

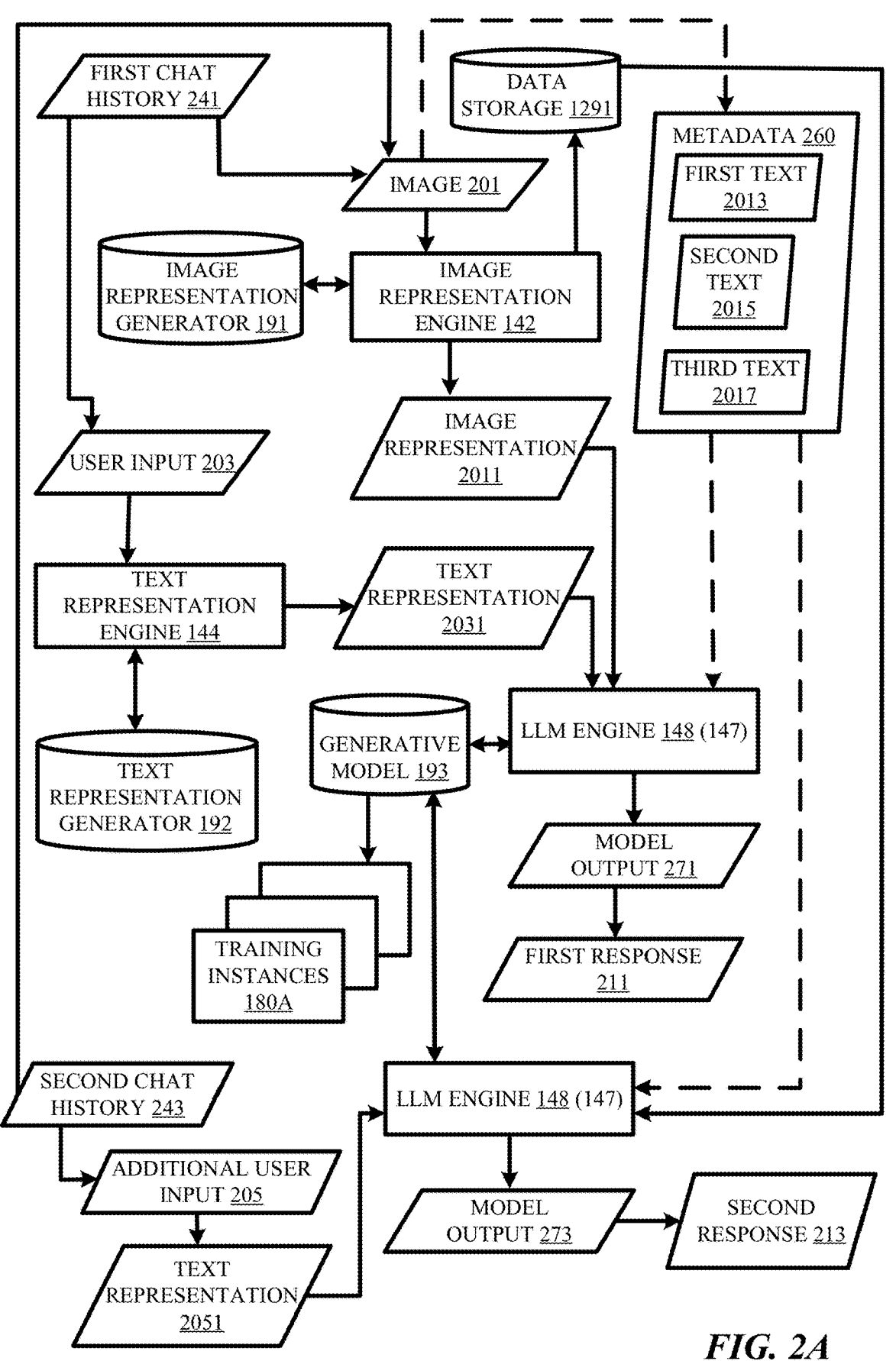

FIRST CHAT HISTORY 241

DATA STORAGE 1291

METADATA 260

FIRST TEXT 2013

SECOND TEXT 2015

THIRD TEXT 2017

IMAGE 201

IMAGE REPRESENTATION GENERATOR 191

IMAGE REPRESENTATION ENGINE 142

IMAGE REPRESENTATION 2011

USER INPUT 203

TEXT REPRESENTATION ENGINE 144

TEXT REPRESENTATION 2031

TEXT REPRESENTATION GENERATOR 192

GENERATIVE MODEL 193

LLM ENGINE 148 (147)

MODEL OUTPUT 271

TRAINING INSTANCES 180A

FIRST RESPONSE 211

SECOND CHAT HISTORY 243

ADDITIONAL USER INPUT 205

LLM ENGINE 148 (147)

MODEL OUTPUT 273

SECOND RESPONSE 213

TEXT REPRESENTATION 2051

*FIG. 2A*

PRESERVATION OF VISUAL CONTENT ACROSS MULTI-TURN DIALOGS WITH GENERATIVE MODEL(S)

BACKGROUND

Current generative models, e.g., large language models (LLMs), have shown phenomenal generative semantic and compositional power and have been trained on extremely large and diverse language datasets. Some current LLMs are augmented with capabilities of understanding visual content (e.g., image, video, etc.). For example, assume a user provides an image (an image showing a white cat riding a bike) and a user query (e.g., "what's in the image?") relating to the image. In this case, a text description of the image can be generated, e.g., using an image understanding model, such as a visual language model (VLM) or a visual question-answering (VQA) model. A text prompt can be generated based on the text description of the image and the user query. The text prompt is then processed, using an LLM, to generate a response (e.g., "This image shows a cat riding a bike") to the user query relating to the image. However, by limiting the processing by these current generative models to textual descriptions of visual content, human-to-machine interactions with these current generative models suffer one or more drawbacks.

For example, by limiting the processing by these current generative models to textual descriptions of visual content, these techniques may result in information loss as the text description may not fully describe the visual content and/or context of the visual content, which may result in follow-up queries that increase a quantity of user inputs received during the human-to-computer dialog and waste computational and/or network resources. These issues are exacerbated when the human-to-machine interaction spans across multiple turns. Continuing with the above example, further assume that the user provides a follow-up user query (e.g., "what artistic style is the image?") relating to the image. The previously generated text description may not include any information about the artistic style of the image, thereby requiring additional interactions with the image understanding model to inquire about the artistic style of the image, thereby wasting computational and/or network resources and prolonging the human-to-machine interaction due to this additional processing that is required.

SUMMARY

Implementations disclosed herein relate to handling visual content across multi-turn human-to-computer dialogs. In various implementations, during a human-to-computer conversation/dialog between a user and a virtual assistant installed at (or otherwise accessible via) a client device (e.g., cell phone, in-vehicle entertainment system, etc.), processor (s) of a system (e.g., that enables the human-to-computer conversation) can receive user input. The user input can be related to visual content (or more than one instance of visual content) present in the human-to-computer conversation, where the visual content is an image, video, or other visual content. The processor(s) can process the visual content to generate a corresponding tokenized representation (may be referred to as "image representation", which may be image tokens or a sequence of image tokens in the form of numerical vector(s)) of the visual content representing the visual content, in response to detecting the visual content (or a link leading to the visual content) for the first time during the human-to-computer conversation. In some implementations, the processor(s) can generate the corresponding tokenized representation (may be referred to as "text representation", which may be text tokens or a sequence of text tokens in the form of numerical vector(s)) of the visual content, for instance, based on processing pixels of the visual content. In some implementations, the corresponding tokenized representation of the visual content can be generated, e.g., using an image representation generator (e.g., an image encoder trained using one or more machine learning algorithms). Further, the processor(s) can store (e.g., temporarily cache) the corresponding tokenized representation of the visual content in a database that is associated with the human-to-computer conversation, that is associated with the user, or that is associated with a registered account of the user, etc. In some implementations, the processor(s) can discard the corresponding tokenized representation of the visual content of the image in response to the human-to-computer conversation ending.

By storing the corresponding tokenized representation of the visual content in a database that is associated with the human-to-computer conversation (and/or that is associated with a user participating in the human-to-computer conversation, etc.), re-computation of the corresponding tokenized representation of the visual content may be avoided in scenarios where the user subsequently queries (e.g., during the same human-to-computer dialog) about the visual content again, for the third time, etc. This conserves computational resources and reduces latency in causing subsequent responses to be rendered by avoiding the re-computing, for example, of pixels (or a stream of pixels) for the visual content to generate the corresponding tokenized representation of the visual content, which can be a process that is resource-intensive, and time-consuming. This also allows a response responsive to subsequent user input (that queries about the visual content) to contain appropriate information and be generated in an efficient manner, using the corresponding tokenized representation of the visual content (retrieved from the database) and using a corresponding tokenized representation of natural language input included in the subsequent user input, and while avoiding information loss had simply text descriptions of the visual content be processed throughout the human-to-computer conversation.

In some implementations, the processor(s) can generate the response (responsive to the subsequent user input) based on processing, using a generative model, the corresponding tokenized representation of the visual content, the corresponding tokenized representation of the natural language content included in subsequent user input, metadata associated with the visual content or the subsequent user input, and/or other context of the multi-turn conversation, etc. In some implementations, optionally, the database storing the image representation of the image can be located at a server computing device (of the aforementioned system) where the generative model is stored. This can reduce or save consumption of network resources associated with transmitting data containing the corresponding tokenized representation of the visual content to a device where the generative model is stored, and reduce latency in generating the response by obviating the need to transmit the corresponding tokenized representation of the visual content along with the subsequent user input.

In some implementations, the metadata noted above can further include metadata associated with a chat history of the human-to-computer conversation (and/or metadata thereof), where the chat history of the human-to-computer conversation includes at least the visual content and the subsequent user input. In some implementations, the metadata associated with the chat history of the human-to-computer conversation can include a structured file (using or not using markup language) recording one or more user inputs and one or more virtual assistant inputs from the virtual assistant in an order they are received.

For instance, the structured file can include a user input entry for each of the one or more user inputs, where a user input entry for a respective user input can include: a user tag which can be an identifier of a respective user that provides the respective user input, and content of the respective user input. Optionally, the user input entry for the respective user input can include a timestamp of receiving the respective user input. The structured file can further include a virtual assistant entry for each of the one or more virtual assistant inputs, where a virtual assistant entry for a respective virtual assistant input can include: a virtual assistant tag representing the virtual assistant, and content of the respective virtual assistant input. Optionally, the virtual assistant entry for the respective virtual assistant can include a timestamp associated with the respective virtual assistant.

It is noted that, the user input entries of the one or more user inputs and the virtual assistant entries for the one or more virtual assistant inputs can be included in the structured file in an ordered manner (e.g., in a chronological order). In this case, the user input entries of the one or more user inputs and the virtual assistant entries for the one or more virtual assistant inputs can be interleaved.

The structured file can further include one or more system entries, the one or more system entries can include metadata (e.g., image facts, video facts, and/or an identifier) associated with one or more images or videos (e.g., all images, videos, or other visual content) present in the human-to-computer conversation. The image fact(s) of an image can include, for instance, a text description of the image. Such description of the image can include characters/words extracted from the image (e.g., using an optical character recognition model), object name(s) of one or more objects detected from the image (e.g., using an object detection or classification model), and/or a caption determined for the image (e.g., using an image captioning model) that describes a theme (or a caption) of the image (or that summarizes visual content of the image), etc. The video fact(s) of a video can include similar information, but respect to a video that is present in the corresponding tokenized representation of the visual content.

In some implementations, the image (or other visual content) can be from a user input (e.g., uploaded by a user of the user input), or from a virtual assistant input (e.g., retrieved from the Internet using a search for images, generated using an image-generation model, etc.). In implementations where the image (or video, or other visual content) is from a user input, the user input entry for the user input (that includes the image or video) can include an identifier (e.g., an image tag or video tag, or an image label or video label, etc., including information such as a reference number for tracking/referencing the image or video) of the image or video. Correspondingly, a system entry can be generated for the image or video, and can be associated with (e.g., arranged as following) the user input entry for the user input that includes the image or video by including the identifier of the image or video, instead of or in addition to, the image facts of the image and/or the video facts of the video.

In implementations where the image or video is from a virtual assistant input (e.g., generated using an image or video generation model accessible via the virtual assistant), the virtual assistant entry for the virtual assistant input (that includes the image or video) can include an identifier (e.g., an image tag or video tag, or an image label or video label, etc., including a reference for tracking/referencing the image or video) of the image or video. Correspondingly, a system entry can be generated for the image or video, and can be associated with (e.g., arranged as following) the virtual assistant entry for the virtual assistant input by including the identifier of the image or video, in addition to or instead of, the image facts of the image and/or the video facts of the video.

By including the image facts and/or the video facts in a system entry in association with a user input entry in case the user input (in the user input entry) provides the image and/or video, or by at least including the image facts or video facts in the system entry and in association with a virtual assistant entry in case the user input is provided by a virtual assistant input), image or video understanding capability of the system that enables the human-to-computer conversation is maintained. This may, however, require an identifier (e.g., a reference number, such as "image_1", "video_1", etc.) of the image or video to associate the system input entry with a corresponding user input entry (or a corresponding virtual assistant entry).

In some implementations, the image facts of an image may not be included in system entries, and instead, the image facts of the image can be included directly in a user input entry for a user input, or in a virtual assistant entry for a virtual assistant input. For instance, if the image is from a particular user input, the aforementioned image facts can be included in a user input entry for the particular user input, where the image facts can be placed following the image, or an identifier of the image, in the user input entry. For instance, if the image is from a particular virtual assistant input, the aforementioned image facts can be included in a virtual assistant input entry for the particular user input, where the image facts can be placed following the image in the virtual assistant entry. By including the image facts directly in a user input entry for a user input that provides the image (or in a virtual assistant entry for a virtual assistant input that provides the image), the system enables a generative model that is utilized to generate virtual assistant response(s) responsive to user input(s), to link or associate the image fact and the image in a quick and convenient manner. However, this may sometimes confuse the generative model, where the image facts may be considered by the generative model as being part of the user input, despite the fact that the image facts are generated using machine learning (ML) models based on the image and are not from any user input.

In some implementations, the structured file recording the chat history of the human-to-computer conversation/dialog (e.g., the one or more user inputs and one or more virtual assistant inputs) may not include or store any image facts. In some implementations, in cases where image facts are retrieved by the system for an image, the structured file recording the chat history of the human-to-computer conversation/dialog can remove the image facts to simplify the information in the structured file. In this case, the image facts may not be provided to the generative model. In other words, in this case, the image facts of the image may not be utilized (e.g., using the generative model) in generating a response responsive to a user input.

In some implementations, optionally, a system entry can include a tokenized representation marker (e.g., an image representation marker such as "<image-tokens>", a video representation marker such as "<video-tokens>", etc.) to mark an image (or other visual content such as a video, etc.). In some implementations, the image representation marker (or other tokenized representation markers) can be embedded with a link to retrieve a tokenized representation of an image (or other visual content), where the tokenized representation of the image can be stored in the aforementioned database. In some implementations, the image representation marker (or other tokenized representation markers), when occurred the first time in the metadata associated with the chat history (e.g., in the structured file as described above) can include the tokenized/image representation of the image. In some implementations, the image representation marker (or other markers), when subsequently occurred in the metadata associated with the chat history, can be embedded with a link to a first location of the image representation marker where the image representation is expressed.

In some implementations, the image presentation marker can be indexed (e.g., <image tokens_0>, <image tokens_1>, etc.). In some implementations, an image representation marker for a first image can include a first reference number (e.g., "0"), and an image representation marker for a second image (distinct from the first image) can include a second reference number ("1"). For instance, the image representation marker for the first image can be "<Image-tokens-0>", and the image representation marker for the second image can be "<Image-tokens-1>".

In some implementations, optionally, the system entry can include the image representation marker marking the image, with or without the image facts for the image. In some implementations, the image representation marker marking the image can be included in the user input entry for the user input that provides the image, along with or without the image facts for the image. In some implementations, optionally, the image representation marker marking the image can be included in the virtual assistant entry for the virtual assistant input that provides the image, along with or without the image facts for the image.

The preceding disclosure is presented as an overview of only some implementations disclosed herein. These and other implementations are disclosed in additional detail later in this disclosure. For instance, one or more evaluation instances can be generated to evaluate responses generated using a generative model based on input described in accordance with various implementations herein. As another example, one or more training instances can be generated to include a multi-turn conversation having one or more images and one or more responses to user queries regarding one or more of the images. The one or more training instances can be applied to fine-tune the aforementioned generative model (e.g., via supervised fine-tuning). As a further example, the one or more images in a multi-turn conversation can be processed to filter out unsafe image(s), or add a warning message for any image determined as potentially unsafe, where the warning message can be provided to the generative model utilized to generate response(s) responsive to user queries relating the one or more images (or a portion thereof). Additionally, it is noted that while many implementations are provided describing tokenized representation of image(s), these implementations can be applied to other visual content such as videos, photos captured using cameras, 3D point clouds, hand-drawn sketches, charts, etc.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

FIG. 1B illustrates an example of marked-up chat histories as a chat continues, in accordance with various implementations of the present disclosure.

FIG. 1C illustrates another example of marked-up chat histories as a chat continues, in accordance with various implementations of the present disclosure.

FIG. 2A illustrates an example scenario where responses to user queries directed to an image are generated using techniques described in accordance with various implementations of the present disclosure.

DETAILED DESCRIPTION

The following description with reference to the accompanying drawings is provided for understanding of various implementations of the present disclosure. It is appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

Figure 1A:
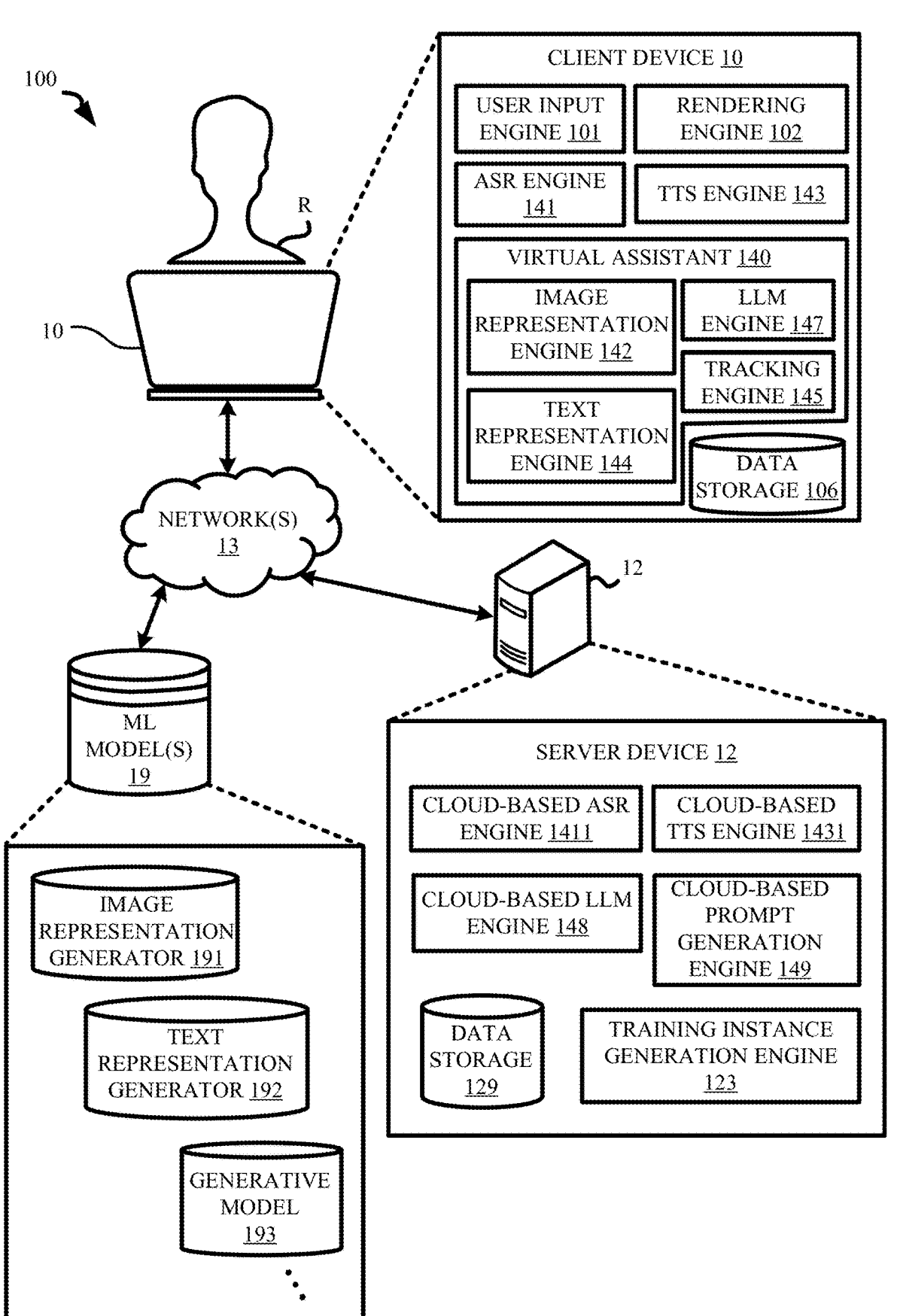
FIG. 1A depicts a block diagram of an example environment that demonstrates various aspects of the present disclosure, and in which some implementations disclosed herein can be implemented.

FIG. 1A is a block diagram of an example environment 100 that demonstrates various aspects of the present disclosure, and in which implementations disclosed herein may be implemented. As shown in FIG. 1A, the environment 100 can include a client computing device 10 ("client device") that is in communication with a server computing device 12 ("server device"). The client computing device 10 can be in communication with the server computing device 12, via one or more networks 13. The one or more networks 13 can include, for example, a local area network (LAN), a wide area network (WAN) such as the Internet, and/or any other appropriate network. In some implementations, the client computing device 10 (and/or the server computing device 12) can be in communication with one or more machine learning (ML) models, via the one or more networks 13.

In some implementations, the environment 100 can be an office environment, a home environment, a lab environment, or any other applicable environment, and can include additional device(s) in communication with the client computing device 10 (or the server computing device 12). In some implementations, the client computing device 10 can be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a smart watch, a virtual or augmented reality computing device), and the present disclosure is not limited thereto.

In various implementations, the client computing device 10 can include a user input engine 101 that is configured to detect user input provided by a user (e.g., user R) of the client computing device 10. The user input may be provided by the user using one or more user interface input devices, such as a keyboard, a touch screen, a microphone, etc. The user input can be typed input, touch input, audible input, or any other applicable type of input. For example, the client computing device 10 can be equipped with a keyboard to receive typed input, and/or a mouse (or one or more hardware buttons) to receive a user click that selects one or more graphical user interface (GUI) elements that is rendered visually at a user interface of the client computing device 10. The typed input can be received, for instance, via an input field (e.g., 209 in FIG. 2B) of a graphical user interface (GUI) of an application. Additionally, or alternatively, the client computing device 10 can be equipped with one or more microphones that capture audio data, such as audio data capturing spoken utterances of the user and/or other sounds in an environment of the client computing device 10. Optionally, the audio data capturing the spoken utterances can be received in response to a user selecting an icon (e.g., 207 in FIG. 2B) indicating recording of audio data. Additionally, or alternatively, the client computing device 10 can be equipped with one or more vision components that are configured to capture vision data corresponding to images and/or movements (e.g., gestures) detected in a field of view of one or more of the vision components. Additionally, or alternatively, the client computing device 10 can be equipped with one or more touch sensitive components (e.g., a stylus, a touch screen, a touch panel, etc.) that are configured to capture signal(s) corresponding to touch input that is directed to the client computing device 10.

In various implementations, the client computing device 10 can include a rendering engine 102, one or more applications installed locally at, or otherwise accessible via, the client computing device 10, and/or a data storage 106. The one or more applications can include, for instance, a virtual assistant 140 (also referred to as a virtual assistant application) that enables human-to-computer dialogs between a single user (or a group of users) and the virtual assistant 140. The virtual assistant 140 can be in communication with one or more ML model(s) 19 or a portion thereof (e.g., the aforementioned generative model).

In various implementations, the rendering engine 102 can be configured to provide content for audible and/or visual presentation to a user of the client computing device 10 using one or more user interface output devices. For example, the client computing device 10 can be equipped with one or more speakers that enable content (e.g., "This video shows love between human and dog") to be provided for audible presentation to the user via the client computing device 10. Additionally, or alternatively, the client computing device 10 can be equipped with a display or projector that enables content (e.g., "the dog in the video is a Pembroke Welsh Corgi, originated in Wales and known for their short legs, fluffy butts, and large ears") to be provided for visual presentation to the user via the client computing device 10.

The data storage 106, and/or a data storage 129 at the server device 12, can store various types of files and/or data. For instance, the data storage 106 can store metadata (e.g., a user profile of user R, etc.) associated with the one or more applications and/or associated with the client computing device 10. Additionally, or alternatively, in some implementations, the data storage 106 (or the data storage 129) can store a plurality of training instances (e.g., 180A in FIG. 2A) to train or fine-tune machine learning (ML) model(s) 19. In some implementations, the ML model(s) 19 can include a generative model 193. The generative model 193 can be, for instance, a large language model ("LLM"). In some implementations, the data storage 129 at the server device 12 (or the data storage 106) can include one or more databases/data storages 1291 (see FIG. 2A) or data centers. Each of the one or more databases 1291 can be specific to a corresponding user of the virtual assistant 140, for instance, to store or cache a chat history of the corresponding user (e.g., human-to-computer dialogs between the corresponding user and the virtual assistant 140) and/or metadata associated with the chat history. The metadata associated with the chat history can include, for instance, an image identifier for each image present in the chat history, and/or other media content markers such as a video marker for a video, a point cloud marker for 3D point cloud, etc.

In some implementations, training (or fine tuning) of the generative model (e.g., 193) can be performed through supervised learning and/or reinforcement learning. The reinforcement learning can be, for instance, reinforcement learning from human feedback ("RLHF") that incorporates human feedback into the training or fine-tuning of the LLM to align output of the LLM with human preferences. This can be implemented using a reward model trained based on human feedback. For instance, for a given user input and a plurality of responses responsive to the given user input, a human reviewer can indicate a preference (e.g., in the form of a scalar score) for each of the plurality of responses. In other words, the plurality of response for the given user input can be ranked in an order from highest human preference (indicated by a highest scalar score) to lowest human preference (indicated by a lowest scalar score). In some implementations, the scalar scores assigned by the human reviewer to the plurality of responses for the given user input can satisfy a Gaussian distribution with an average value of approximately "0", where the scalar score(s) for response(s) of higher human preference should be positive and increase with the increasing of human preference and the scalar score(s) for response(s) of lower human preference should be negative and decreases with the decreasing of human preference.

The scalar score can be applied as a reward in the RLHF process, where a large value of the scalar score indicates a higher quality of a corresponding response more preferred by the human reviewer and a lower value of the scalar score indicates a higher quality of a corresponding response that is less preferred by the human reviewer. In some implementations, such given user input and the plurality of responses responsive to the given user input can be stored in the data storage 106 (or the storage 129) as one instance for training the reward model. In some implementations, a small quantity of instances can be manually curated and/or stored in the data storage 106 (or 129), to train the reward model.

In some implementations, the one or more applications can additionally, or alternatively, include a social media application, a video player, a search application, a note-taking application, a shopping application, a messaging application, and/or any other appropriate applications (or services) installed at, or accessible via, the client computing device 10.

In various implementations, the client computing device 10 can further include a plurality of local components. The plurality of local components can include, for instance, an automatic speech recognition (ASR) engine 141 and/or a text-to-speech (TTS) engine 143. In some implementations, the ASR engine 141 and/or the TTS engine 143 may be, but does not necessarily need to be, included in the virtual assistant 140. In some implementations, a user (e.g., user R) of the client computing device 10 may have a registered account associated with the virtual assistant 140, or other application(s). In some implementations, additionally or alternatively, the plurality of local components at the client computing device can include other component(s) such as an LLM engine 147 and/or a tracking engine 145. The LLM engine 147 can be included, for instance, in the virtual assistant 140. The tracking engine 145 can be included, for instance, in the virtual assistant 140. Optionally, the virtual assistant 140 can include an image representation engine 142 configured to process pixels of an image to generate tokenized representation of the image, and/or a text representation engine 144 configured to process a text to generate tokenized representation of the text.

In some implementations, the ASR engine 141 (and/or a cloud-based ASR engine 1411) can process, using one or more streaming ASR models (e.g., a recurrent neural network (RNN) model, a transformer model, and/or any other type of ML model capable of performing ASR), streams of audio data that capture spoken utterances, to generate corresponding streams of ASR output. The ML model(s) can be on-device ML models that are stored locally at the client computing device 10, remote ML models that are executed remotely from the server computing device (e.g., at remote server device 12), or shared ML models that are accessible to both the client computing device 10 and/or remote systems (e.g., the remote server computing device 12). The audio data can be acquired from audio recordings or can be generated by microphone(s) of the client computing device 10. Notably, the streaming ASR model can be utilized to generate the corresponding streams of ASR output as the streams of audio data are generated.

In some implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 141 and/or 1411 can select one or more of the ASR hypotheses as corresponding recognized text ("transcript") that corresponds to the spoken utterance (s) (e.g., selected based on the corresponding predicted measures).

The TTS engine (e.g., 143 and/or 1431) can process, using TTS model(s), corresponding streams of textual content (e.g., content generated based on LLM or a predetermined text, etc.) to generate synthesized speech audio data that includes computer-generated synthesized speech. In additional or alternative implementations, the synthesized speech audio data can be pre-cached in memory or in one or more databases accessible by the client computing device 10.

In various implementations, the one or more ML models 19 can include an image representation generator 191 (e.g., an image encoder) that processes image pixels of an image, to generate an image representation (e.g., image tokens in the form of numerical vectors) representing the image. In various implementations, the one or more ML models 19 can include a text representation generator 192 (e.g., a text encoder) that processes content of a text (e.g., recognized from user input), to generate a text representation (e.g., text tokens in the form of numerical vectors) representing the text. In various implementations, the generative model 193 can be a multi-modal LLM capable of processing the text representation of the text, the image representation of the image, and/or other representations (e.g., a point cloud representation of a 3D point cloud, audible representation of an audio, etc.).

In various implementations, a user can provide a user query relating to an image (e.g., a photo, or other visual content such as videos, charts, etc.), where the user query can be received via a user interface (e.g., audible or graphical) of the virtual assistant 140 that facilitates conversations between the user and the virtual assistant 140. As a working example, the image can be a photo (e.g., uploaded by the user or synthesized by a generative model, etc.) which shows that a dog is smelling a flower, and the user query relating to the image can be, for instance, "please provide a description of the image". In this working example, pixels of the image (e.g., showing that a yellow dog is smelling a white flower) can be processed, e.g., by the tracking engine 145 and using the image representation generator 191, to generate an image representation (e.g., a tokenized representation representing the image in the form of numerical vectors) of the image. The user query relating to the image (e.g., "please provide a description of the image") can be processed, e.g., using the text representation generator 192, to generate a text representation (e.g., a tokenized representation representing the user query in the form of numerical vectors) of the user query.

Continuing with the working example above, the image/tokenized representation of the image (e.g., showing that a yellow dog is smelling a white flower) and the text/tokenized representation of the user query (e.g., "please provide a description of the image") can be processed as input, using the generative model 193, to generate a model output from which a response responsive to the user query is derived. In this working example above, the response can be, for instance, "This image shows a yellow dog smelling a white flower". It is noted that, in the conventional approach, instead of the tokenized/image representation derived from image pixels of the image, a text description (e.g., "a dog is smelling a flower") of the image can be determined for the image using image-understanding model(s)). In such conventional approach, the text description and the user query can be processed to determine a response such as "This image shows that a dog is smelling a flower" that omits certain information (e.g., color information, textile information, image style, etc.) when compared to the response ("This image shows a yellow dog smelling a white flower") generated based at least on the tokenized representation of the image.

Optionally, in some implementations, in addition to deriving the tokenized representation of the image using the image pixels of the image, the image can be processed, using an optical character recognition (OCR) model, to extract characters (or other types of text, if any, e.g., "spring breeze") that are present in the image. In this case, the image/tokenized representation of the image (e.g., showing that a yellow dog is smelling a white flower), the text representation of the user query (e.g., "please provide a description of the image"), and a text/tokenized representation of the characters (e.g., "spring breeze") present in the image, can be processed as input, using the generative model 193, to generate a response (e.g., "This image shows a yellow dog smelling a white flower and enjoying the spring breeze") responsive to the user query. The text representation of the character(s) recognized from the image can be generated, e.g., using the text representation generator 192, based on processing the characters recognized from the image. It is noted that, the term "text representation" throughout the disclosure can mean text tokens representing a text in the form of numerical vectors, and the term "image representation" (or video representation, visual content representation, etc.) can mean image tokens (video tokens, etc.) representing pixels of visual content in the form of numerical vectors.

In some implementations, optionally, the image can be processed, using an object recognition model, to extract names of one or more objects (e.g., dog & flower, or more specifically, Pembroke Welsh Corgi & white rose) recognized from the image. In this case, the image representation of the image (e.g., showing that a yellow dog is smelling a white flower), the text representation of the user query (e.g., "please provide a description of the image"), the text representation of the characters (e.g., "spring breeze") shown and extracted from the image, and a text representation of the names of the one or more objects (e.g., dog, flower) recognized from the image, can be processed as input, using the generative model 193, to generate the response responsive to the user query. The text/tokenized representation of the names of the one or more objects recognized from the image can be generated, e.g., using the text representation generator 192, based on processing the names of the one or more objects extracted from the image.

In some implementations, optionally, the image representation of the image (e.g., showing that a yellow dog is smelling a white flower), the text representation of the user query (e.g., "please provide a description of the image"), the text representation of the characters (if any) extracted from the image, the text representation of the names of the one or more objects recognized from the image, and/or a search result of a search using the names of the one or more objects, can be processed as input, using the generative model 193, to generate the response responsive to the user query.

In some implementations, optionally, the image can be processed, e.g., using an image captioning model, to generate a caption (in natural language) for the image that describes image content of the image. In this case, the image representation of the image (e.g., showing that a yellow dog is smelling a white flower), the text representation of the user query (e.g., "please provide a description of the image"), the text representation of the characters extracted from the image, and a text/tokenized representation of the caption (e.g., "dog smelling a flower") for the image that describes image content of the image, can be processed as input, using the generative model 193, to generate the response responsive to the user query. The text representation of the caption for the image that describes image content of the image can be generated, e.g., using the text representation generator 192, based on processing the text representation of the caption for the image that describes the image content of the image.

In some implementations, optionally, the image representation of the image (e.g., showing that a yellow dog is smelling a white flower), the text representation of the user query (e.g., "please provide a description of the image"), the text representation of the caption for the image that describe image content of the image, can be processed as input, using the generative model 193, to generate the response responsive to the user query.

In some implementations, optionally, the image representation of the image (e.g., showing that a yellow dog is smelling a white flower), the text representation of the user query (e.g., "please provide a description of the image"), the text representation of the characters extracted from the image, and the text representation of the caption for the image that describe image content of the image, can be processed as input, using the generative model 193, to generate the response responsive to the user query.

In some implementations, optionally, the image representation of the image (e.g., showing that a yellow dog is smelling a white flower), the text representation of the user query (e.g., "please provide a description of the image"), the text representation of the names of the one or more objects extracted from the image, and the text representation of the caption for the image that describe image content of the image, can be processed as input, using the generative model 193, to generate the response responsive to the user query.

In some implementations, the characters (if any) recognized from the image (or other visual content), the names of the one or more objects recognized from the image (or other visual content), a search result of a search using the names of the one or more objects, and/or the caption that describe image content of the image (or other visual content) can be referred to as "image facts" or "visual content facts" of the image (or other visual content). However, "image facts" of the image are not limited to descriptions herein, and can include any applicable natural language content associated with the image (or other visual content).

In some implementations, optionally, the image representation of the image (e.g., showing that a yellow dog is smelling a white flower), the text representation of the user query (e.g., "please provide a description of the image"), the text representation of the characters extracted from the image, the text representation of the names of the one or more objects extracted from the image, and the text representation of the caption for the image that describe image content of the image, can be processed as input, using the generative model 193, to generate the response responsive to the user query.

In various implementations, the image representation (e.g., image tokens) derived from pixels of the image that represents image content of the image can be stored in a database (e.g., 1291 in FIG. 2A) of the virtual assistant 140. Optionally, the database of the virtual assistant 140 can be specific to the user that provides the user input and that has a registered account of the virtual assistant 140. Optionally, the database of the virtual assistant 140 can be specific to a human-to-computer dialog or a chat history/conversation between the user and the virtual assistant 140. Optionally, the database of the virtual assistant 140 can be associated with the client computing device 10 via which the virtual assistant 140 is accessed. The storage of the image representation (e.g., image tokens) that represents the image content of the image can save computational resources and associated time otherwise needed for re-computing the image representation of the image in situations where one or more subsequent user queries are identified as being related/directed to the image.

In various implementations, the LLM engine 147 can include, or otherwise communicate with, the tracking engine 145, to mark and/or track the image representation of the image. For instance, the tracking engine 145 can generate an image index (e.g., "0", "1", etc.) for the image representation of the image, and can generate an entry for the image in the database (e.g., 129), to store the image/tokenized representation of the image and the image index for the image representation of the image. Optionally, the entry for the image in the database (e.g., 129) can further include the text representation of the characters extracted from the image, the text representation of the names of the one or more objects extracted from the image, and/or the text representation of the caption for the image that describe image content of the image.

Continuing with the working example above, an additional user query (e.g., "The dog in the image is so cute, how to describe her face?") can be received via the user interface of the virtual assistant 140. The user query and the additional user query can be received during the same human-to-computer dialog (e.g., a multi-turn conversation) between the user and the virtual assistant. In response to receiving the additional user query, the image representation of the image can be retrieved from the database (e.g., 1291), using the image index for the image representation of the image. The image representation of the image, a text representation of the additional user query, and/or other metadata (e.g., the text representation of the characters extracted from the image, the text representation of the names of the one or more objects extracted from the image, and/or the text representation of the caption for the image that describe image content of the image, etc.) can be processed, using the generative model 193, to generate an additional model output from which an additional response responsive to the additional user query can be derived. Continuing with the working example above, the additional response can be, for instance, "She has a happy, fox face, with prick ears and a black nose".

In some implementations, additionally, or alternatively, other metadata can be processed, along with the image representation of the image (or other visual content) and the text representation of the user query (or the additional user query), using the generative model (e.g., 193), to generate the response (or the additional response) responsive to the user query (or the additional user query). For example, the other metadata can include a conversation history ("chat history") that includes the user query. The conversation history can be processed (e.g., marked up) to generate a structured file that records one or more user inputs (e.g., the user query of "please provide a description of the image" and/or "The dog in the image is so cute, what breed of dog is that") and one or more virtual assistant inputs (e.g., a virtual assistant input of "This image shows a yellow dog smelling a white flower") from the virtual assistant in an order they are received. The structured file, in some circumstances, can be utilized to assist in tracking or referencing visual content (such as image, video, 3D point cloud, etc.), and/or in retrieving tokenized representation of such visual content (or facts associated therewith).

As described previously, the structured file (e.g., marked up chat history) can include a user input entry (e.g., 281 in part (a) of FIG. 1B) for each of the one or more user queries/inputs, where a user input entry for a respective user input can include: a user tag (e.g., "user_1" in part (a) of FIG. 1B, or "Jerry", etc.) which can be an identifier of a respective user that provides the respective user input, and content of the respective user input ("Please provide a description of the image" in part (a) of FIG. 1B). Optionally, the user input entry for the respective user input can include a timestamp of receiving the respective user input, but this is not required.

As a non-limiting example, referring to part (b) of FIG. 1B, the structured file associated with the chat history can, additionally, or alternatively, include a virtual assistant entry (e.g., 283) for each of the one or more virtual assistant inputs, where a virtual assistant entry for a respective virtual assistant input can include: a virtual assistant tag ("virtual assistant") representing the virtual assistant, and content of the respective virtual assistant input (e.g., "This image shows a yellow dog smelling a white flower"). Optionally, the virtual assistant entry for the respective virtual assistant can include a timestamp associated with the respective virtual assistant, but this may not be required. It is noted that, the user input entries of the one or more user inputs and the virtual assistant entries for the one or more virtual assistant inputs can be included in the structured file in an ordered manner (e.g., in a chronological order). In this case, the user input entries of the one or more user inputs and the virtual assistant entries for the one or more virtual assistant inputs can be interleaved.

It is noted that the structured file can be updated (see part (c) of FIG. 1B) in response to detecting newly received user input (e.g., "The dog in the image is so cute, how to describe her face") and/or virtual assistant input. In this case, the structured file can further include a user input entry 285. For instance, the user input entry 285 can identify a user of an additional user input (e.g., "The dog in the image is so cute, how to describe her face"), content of the additional user input (e.g., "The dog in the image is so cute, how to describe her face").

In some implementations where the image (or other visual content) is from a user input (e.g., uploaded by a user), the user input entry (e.g., 281 or 285) for the user input (that includes the image or other visual content) can include an identifier (e.g., "image_1" in FIG. 1B, which can be an image tag or video tag, or an image label or video label, or an image marker or video marker, etc., including information such as an index or reference number "1") for tracking/referencing the image or video) of the image or video. Additionally, or alternatively, the user input entry (e.g., 281 or 285) for the user input can include one or more image facts (or other visual content facts) of the image (or other visual content). For instance, the one or more image facts of the image can include one or more of: optical characters (e.g., "spring breeze") recognized from the image, a text description (e.g., a caption of the image, such as "a yellow dog smelling a white flower") of the image (e.g., generated using an image understanding model), names of one or more objects recognized from the image, search results based on a search of one or more objects recognized from the image, etc. In some implementations, based on determining that the additional user input is directed to a previously occurred image (e.g., "image_1" having pixels showing a yellow dog smelling a white flower), the user input entry 285 can further include, image facts (e.g., caption, recognized optical characters, object names of objects in the image, search result of a search using one or more of the objects, etc.) of the previously occurred image (e.g., "image_1"), etc.

In some implementations, the structured file can further include one or more system entries, the one or more system entries can include or indicate metadata (e.g., image tokens) associated with one or more images or videos (e.g., all images, or videos, or other visual content) present in the human-to-computer conversation. For instance, referring to FIG. 1C, the structured file associated with the chat history can include a system entry 280, where the system entry 280 can include a system message indicating an identifier and/or an address of a database that caches image tokens (or tokens generated for other visual content, e.g., video, chart, etc.) for images present in the chat history, image identifiers (or markers) for the images, etc.

As a non-limiting example, referring to FIG. 1C, the system message can be, "the following set of image tokens are generated and cached in <database_chat 1> for the two images in this chat/conversation/dialog: <image tokens_1>, <image tokens_2>". In this example, the system message can include a database marker (e.g., <database_chat 1>) for a specific database that stores image tokens (or other tokenized representations, such as video tokens, etc.) in a chat history between the user and the virtual assistant 140. The database marker, optionally, can be embedded with a link to the specific database storing the image tokens in the chat history. The system message can include a first visual content marker (e.g., <image tokens_1>) for retrieving, from the specific database, image tokens (or other visual content tokens) of a first image that is in the chat history. The system message can further include a second visual content marker (e.g., <image tokens_2>) for retrieving, from the specific database, image tokens of a second image that is in the chat history.

In some implementations, instead of including the image facts in a user input entry or a virtual assistant entry, the image facts as described above can be included in the system message in association with corresponding images. Optionally, the system message can include an image fact marker (or referred to as "visual content fact marker") for image fact(s) determined for each image in the chat history, where the image fact marker can be applied to retrieve, from the specific database, the image facts (for the images present in the chat history) that are stored in the specific database.

As described previously, the image fact(s) of an image can include, for instance, a text description of the image. Such description of the image can include characters/words extracted from the image (e.g., using an optical character recognition model), object name(s) of one or more objects detected from the image (e.g., using an object detection or classification model), and/or a caption determined for the image (e.g., using an image captioning model) that describes a theme of the image (or summarizes visual content of the image), etc. The video fact(s) of a video can include similar information, but respect to a video that is present in the corresponding tokenized representation of the visual content.

By including the image facts and/or the video facts in a system entry in association with a user input entry in case the user input (in the user input entry) provides the image and/or video (or in association with a virtual assistant entry in case the user input is provided by a virtual assistant input), image or video understanding capability of the system that enables the human-to-computer conversation is maintained. This may, however, require an identifier (e.g., a reference number, such as "image_1", "video_1", etc.) of the image or video to associate the system input entry with a corresponding user input entry (or a corresponding virtual assistant entry).

In some implementations, as described previously, the image facts of an image may not be included in system entries, and instead, the image facts of the image can be included directly in a user input entry for a user input, or in a virtual assistant entry for a virtual assistant input. For instance, if the image is from a particular user input, the aforementioned image facts can be included in a user input entry for the particular user input, where the image facts can be placed following the image, or an identifier of the image, in the user input. For instance, if the image is from a particular virtual assistant input, the aforementioned image facts can be included in a virtual assistant input entry for the particular user input, where the image facts can be placed following the image in the virtual assistant input. By including the image facts directly in a user input entry for a user input that provides the image (or in a virtual assistant entry for a virtual assistant input that provides the image), the system enables a generative model that is utilized to generate virtual assistant response(s) responsive to user input(s), to link or associate the image fact and the image in a quick and convenient manner. However, this may sometimes confuse the generative model, where the image facts may be considered by the generative model as being part of the user input, despite the fact that the image facts are generated using machine learning (ML) models based on the image and are not from any user input.

In some implementations, the structured file recording the chat history of the human-to-computer conversation/dialog (e.g., the one or more user inputs and one or more virtual assistant inputs) may not include or store any image facts. In some implementations, in cases where image facts are retrieved by the system for an image, the structured file recording the chat history of the human-to-computer conversation/dialog can remove the image facts to simplify the information in the structured file. In this case, the image facts may not be provided to the generative model. In other words, in this case, the image facts of the image may not be utilized (e.g., using the generative model) in generating a response responsive to a user input.

In some implementations, optionally, a system entry can include a tokenized representation marker (e.g., an image representation marker such as (e.g., "<image-tokens>", a video representation marker such as "<video-tokens>", etc.) to mark an image (or other visual content such as a video, etc.). In some implementations, the image representation marker (or other tokenized representation markers) can be embedded with a link to retrieve a tokenized/image representation of an image (or other visual content), where the tokenized/image representation of the image can be stored in the aforementioned database. In some implementations, the image representation marker (or other tokenized representation markers), when occurred the first time in the metadata associated with the chat history (e.g., in the structured file as described above) can include the tokenized/image representation of the image, and can be embedded with a link to a first location of the image representation marker (where the image representation is expressed) for the image when subsequently occurred. In some implementations, the image presentation marker can be indexed. In some implementations, an image representation marker for a first image can include a first reference number, and an image representation marker for a second image (distinct from the first image) can include a second reference number. For instance, the image representation marker for the first image can be "<Image-tokens-0>", and the image representation marker for the second image can be "<Image-tokens-1>".

In some implementations, optionally, the system entry can include the image representation marker marking the image, with or without the image facts for the image. In some implementations, the image representation marker marking the image can be included in the user input entry for the user input that provides the image, along with or without the image facts for the image. In some implementations, optionally, the image representation marker marking the image can be included in the virtual assistant entry for the virtual assistant input that provides the image, along with or without the image facts for the image.

In various implementations, the generative model 193 can be a large language model (LLM) having less than 100 billion parameters, more than 100 billion parameters, or over 200 billion parameters, etc. The greater the number of parameters of an LLM, the more complex (or sophisticated) a task (e.g., specified in a user query or request) the LLM can handle. The LLM may be stored at client computing device 10, or at the server computing device 12. For instance, if the memory of the client computing device 10 restricts the storing of the LLM at the client computing device 10 or if a length of a textual prompt to be processed using the LLM exceeds a predetermined token length, the LLM may be stored at the server device 12. For instance, if the memory of the client computing device 10 does not restrict the storing of the LLM at the client computing device 10, the LLM may be stored at the client computing device 10, to reduce a latency in completing a task (e.g., specified in the user query or request), for instance, by avoiding data communications via the one or more networks 13.

In some implementations, when the generative model 193 is stored at the client computing device 10, the maximum token length of content (e.g., text) processable using the LLM may be a first maximum token length (e.g., 10,000). In some implementations, when the generative model 193 is stored at the server device 12, the maximum token length of content (e.g., text) processable using the generative model may be a second maximum token length (e.g., 30,000) that is greater than the first maximum token length. The maximum token length can be a maximum number of tokens (which can be parsed from a user input) that is allowed for processing, in a single iteration, using the generative model.

In some implementations, the generative model 193 can be a transformer-based LLM. One non-limiting example of such LLM is GOOGLE'S Pathways Language Model (PaLM). Another non-limiting example of such LLM is GOOGLE'S Language Model for Dialog Applications (LaMDA).

In various implementations, the server computing device 12 can be, for example, a web server, one or more blade servers acting together to provide "cloud" infrastructure, or any other type of server as needed. In various implementations, the server computing device 12 can include cloud-based components the same as or similar to the plurality of local components installed at the client computing device 1. For example, the server computing device 12 can include a cloud-based ASR engine 1411, a cloud-based TTS engine 1431, a cloud-based prompt-generating engine 149, and/or a cloud-based LLM engine 148. The cloud-based prompt-generating engine 149 can be configured to generate a text prompt (e.g., "generate an answer to the user question below: 'what color is the sky in the image?'") based on user input (e.g., "what color is the sky in the image?"), where the text prompt is processable using one or more ML models described in this disclosure. It is noted that, however, the one or more ML models can be so trained or fine-tuned that, instead of the text prompt, the user input and the image (and/or the metadata) can be processable using the one or more ML models. In this case, the cloud-based prompt-generating engine 149 may not be needed.

In some implementations, the server computing device 12 can further include a training instance generation engine 123. The training instance generation engine 123 can be applied to generate training instances to train the aforementioned generative model (e.g., 193 in FIG. 1A), and/or to generate instances to train the aforementioned reward model. As described above, the generative model can be trained, e.g., via RLHF using the reward model, to be capable of processing a user query relating to image(s).

Figure 2B:
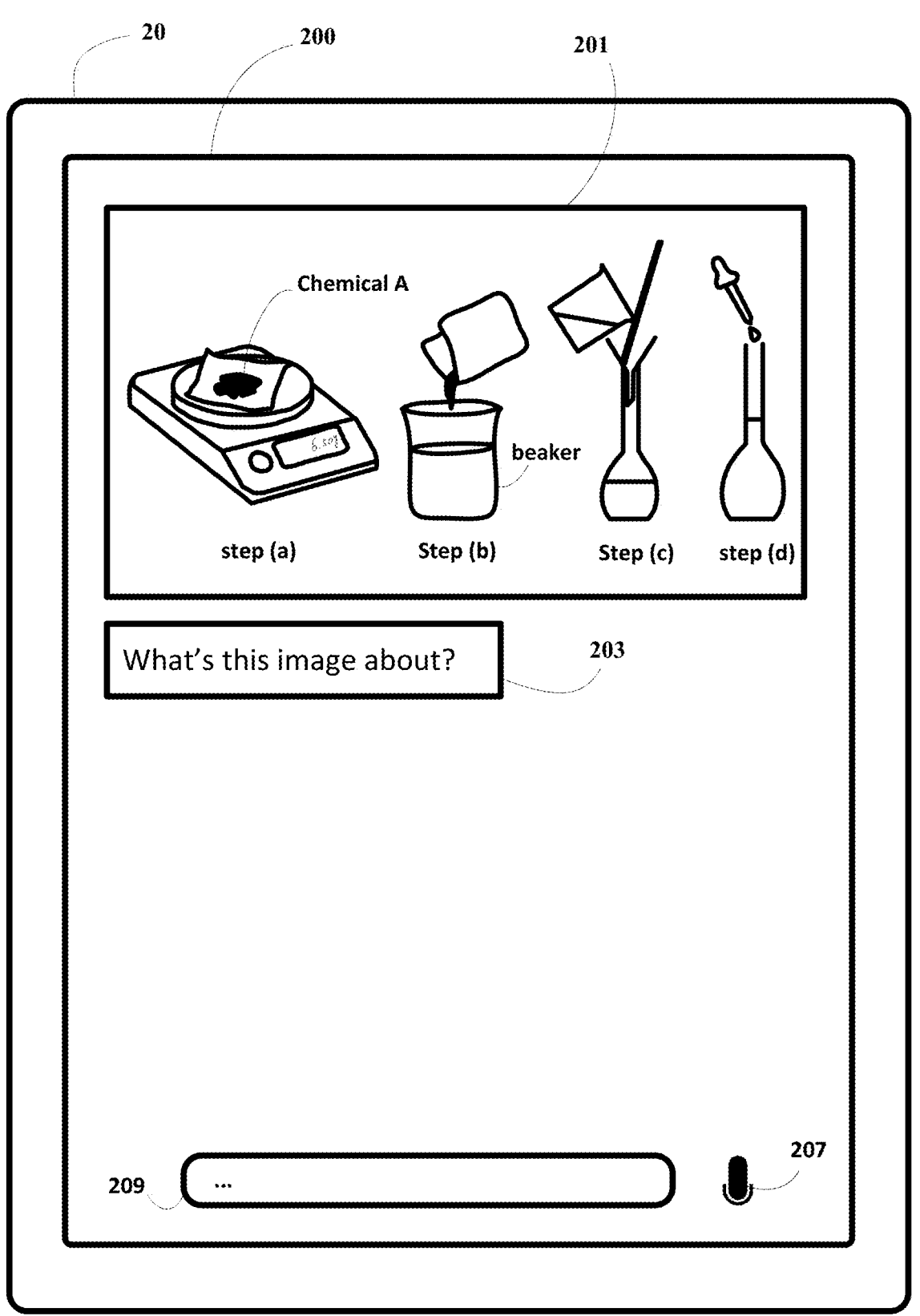
FIG. 2B, FIG. 2C, FIG. 2D, and FIG. 2E illustrate a user interface of a virtual assistant showing a multi-turn conversation, in accordance with various implementations of the present disclosure.
Figure 2C:
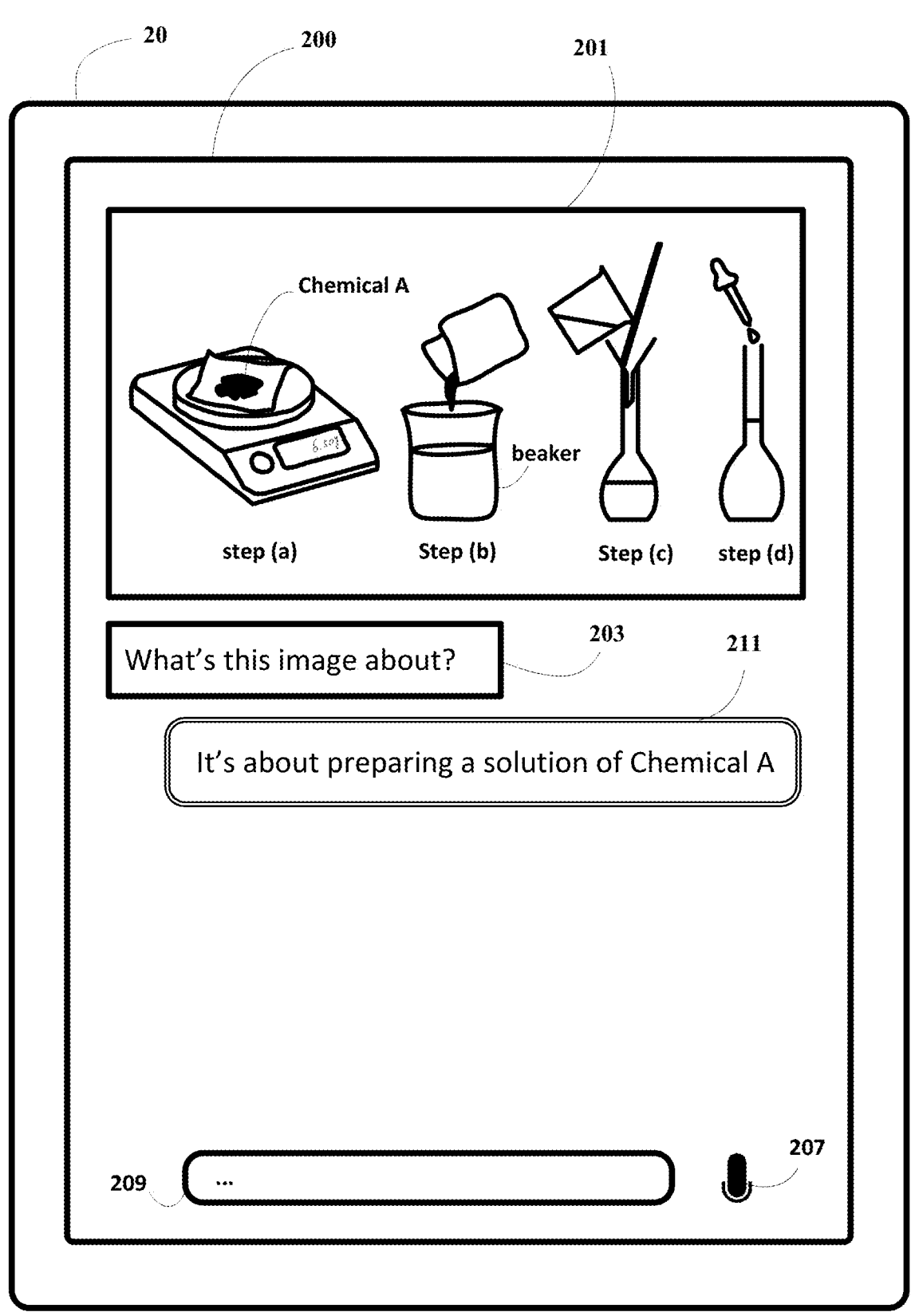
Figure 2D:
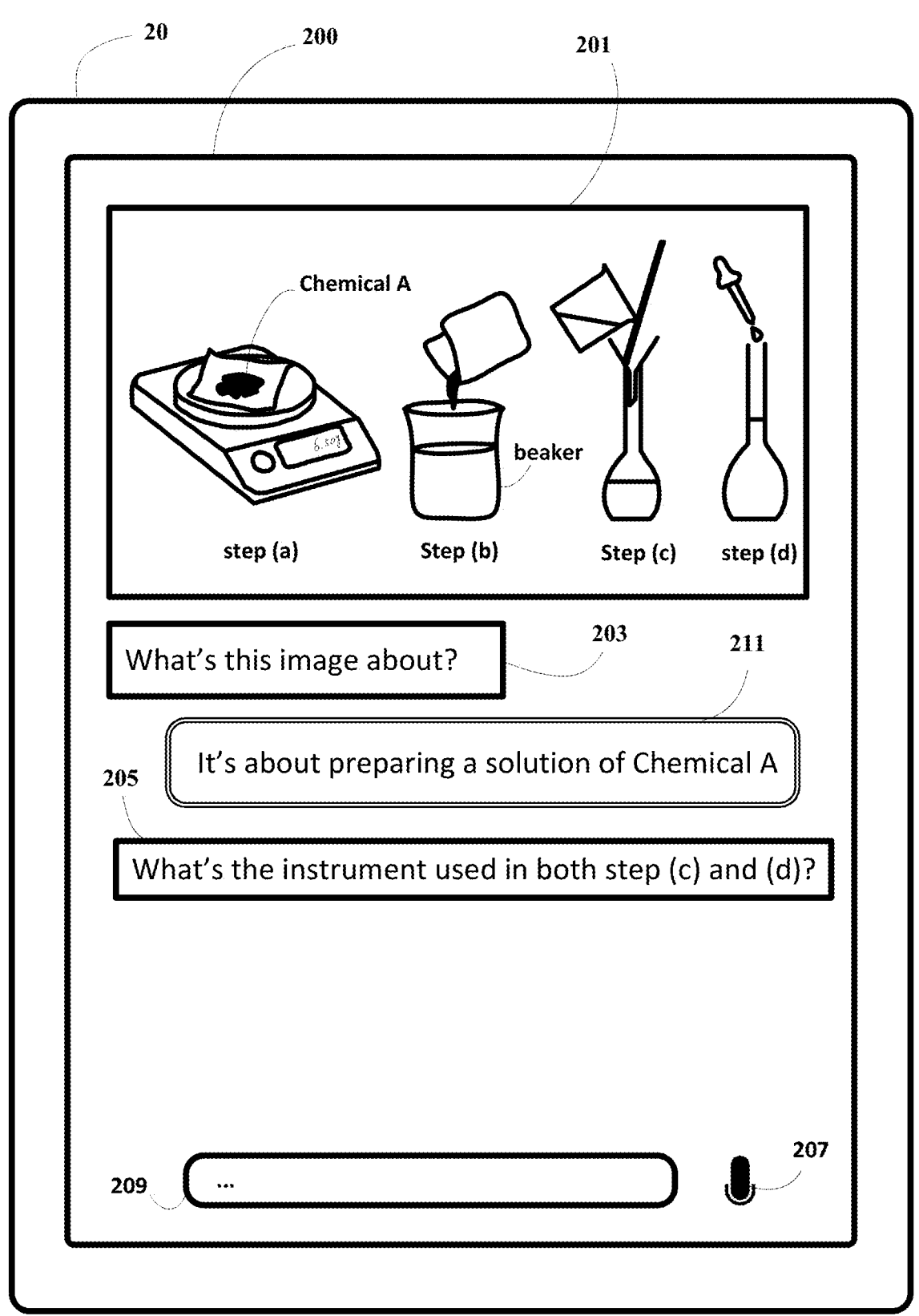
Figure 2E:
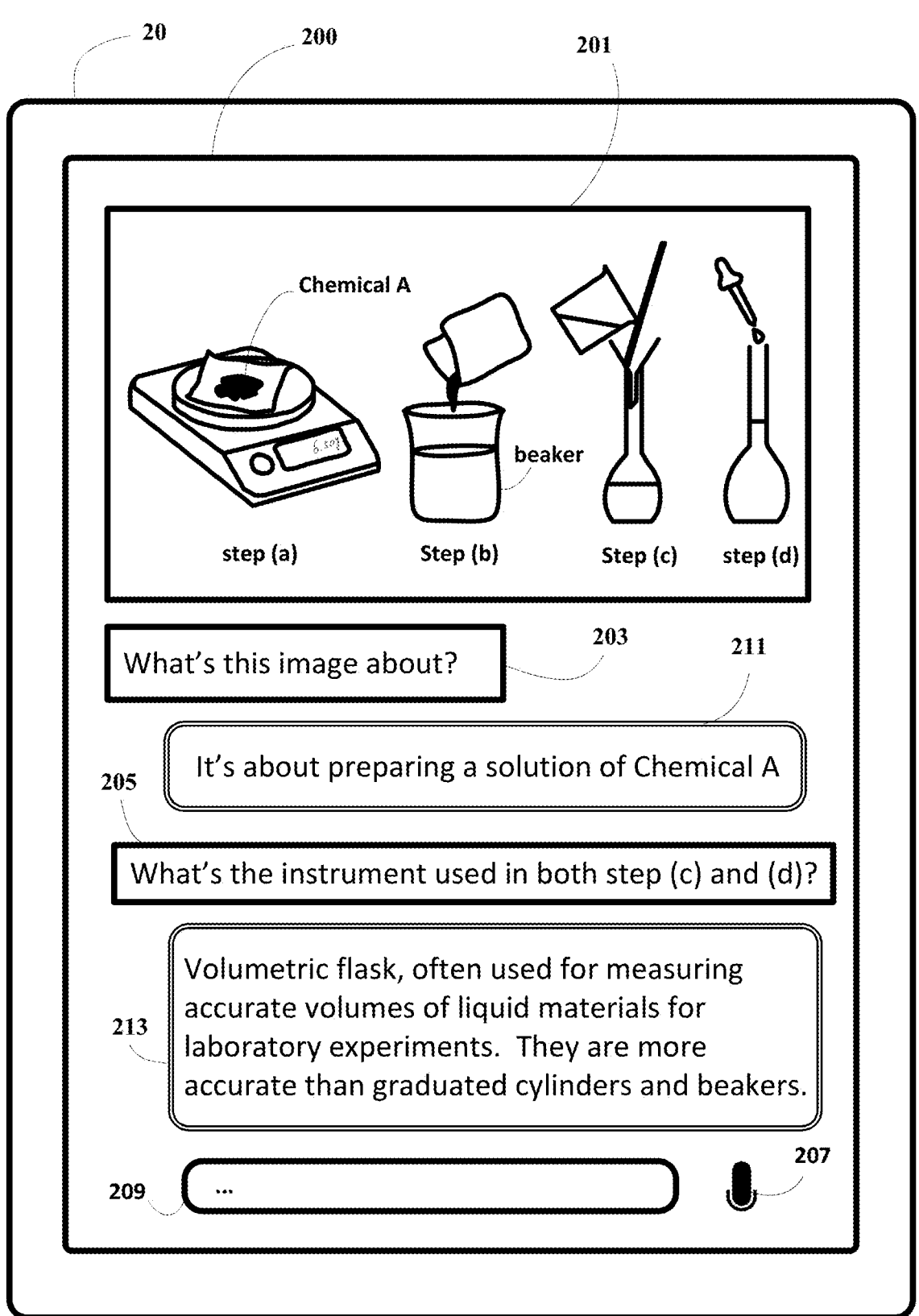

FIG. 2A illustrates an example scenario where responses to user queries directed to an image are generated using techniques described in accordance with various implementations of the present disclosure. FIG. 2B, FIG. 2C, FIG. 2D, and FIG. 2E illustrate a user interface of a virtual assistant showing a multi-turn conversation, in accordance with various implementations of the present disclosure.

As shown in FIG. 2A, a user input 203 from a user (e.g., user R in FIG. 1A) relating to an image 201 can be received, e.g., via a user interface (e.g., 200 in FIG. 2B) of the virtual assistant 140 (or a chat application, etc.) that enables a multi-turn human-to-computer dialog) between the user R and the virtual assistant 140. The virtual assistant 140 can be accessed, for instance, via a client device 20 (e.g., a cell phone). As a first working example, referring to FIG. 2B, the user input 203 can be, for instance, "What's this image about", which is related to the image 201. The image 201, as shown in FIG. 2B, can show a solution preparation process having steps (a)~(d).

Referring back to FIG. 2A, in response to receiving the user input 203 relating to the image 201, the image 201 (e.g., pixels of the image 201) can be processed, by an image representation engine 142 and using the image representation generator 191, to generate an image representation 2011 ("tokenized representation" in the format of numerical vectors) representing image content of the image 201. In some implementations, in response to receiving the user input 203 relating to the image 201, the user input 203 can be processed, by a text representation engine 144 and using the text representation generator 192, to generate a text representation 2031 representing semantic content of the user input 203.

Optionally, the image 201 can be processed, using an OCR model, to generate a first text 2013 that includes characters (if any) recognized from the image 201. The first text 2013 can include, for instance, "step (a)—Chemical A, 6.50 g, step (b)—beaker, step (c), step (d)", extracted from image 201 as shown in FIG. 2B.

Optionally, the image 201 can be processed, using an object detection/classification model, to generate a second text 2015 that includes names (or other identifiers) of object(s) recognized from the image 201. The second text 2015, can include, for instance, "wax weighing scale, digital scale, beaker, volumetric flask, filter funnel, a stirring rod, dropping pipette." Optionally, names of one or more objects recognized from the image 201 can be applied to search information (text, images, or other media content) relating to the one or more objects recognized from the image 201, and the search result can be included in the second text 2015.

Optionally, the image 201 can be processed, using an image captioning model, to generate a third text 2017 that describes the image 201. The third text 2017, can include, for instance, "wax weighing scale on top of a scale to weight Chemical A in step (a), pour the chemical into a beaker with water in step (b), transfer the solution in the beaker to a volumetric flask through a filter funnel and using a stirring rod in step (c), and using a dropping pipette to add distilled water to the flask.

In some implementations, the image representation 2011 representing image content of the image 201 and the text representation 2031 representing semantic content of the user input 203 can be processed as input, by the cloud-based LLM engine 148 (or the LLM engine 147) using a generative model 193 (e.g., multi-modal LLM), to generate a model output 271 from which a first response 211 responsive to the user query 203 is derived. In the first working example above where the user query 203 is "What's this image about", the first response 211, as shown in FIG. 2B, can be, for instance, "It's about preparing a solution of Chemical A".

In some implementations, instead of (or in addition to) the image representation 2011 and the text representation 2031, metadata associated with a first chat history 241 (e.g., metadata that includes the image representation 2011 representing image content of the image 201 and the text representation 2031 representing semantic content of the user input 203 (and/or user input or virtual assistant input preceding the user query 203) can be processed as input, using the generative model 193, to generate the model output 271 from which the first response 211 responsive to the user query 203 is derived. The first chat history 241, as described previously, can be (or be processed into) a structured file (e.g., as shown in FIG. 1B or 1C, or as described previously) having one or more user input entries respectively recording one or more user inputs (e.g., the user input 203) and having one or more virtual assistant input respectively recording one or more virtual assistant inputs/responses (e.g., preceding the user input 203, if there is any) from the virtual assistant 140. As described previously, the structured file can additionally include one or more system entries for providing system information and/or metadata (e.g., metadata 260 as described below) associated with the image 201.

In some implementations, additionally or alternatively, referring to FIG. 2A, the image representation 2011 representing image content of the image 201, the text representation 2031 representing semantic content of the user input 203, and/or metadata 260 associated with the image 201, can be processed as input, using the generative model 193, to generate the model output 271. The metadata 260 can include, for instance, the first text 2013 that includes characters recognized from the image 201, the second text 2015 that includes names (or other identifiers) of object(s) recognized from the image 201 (and/or a search result of performing a search using the names of the objects), and/or the third text 2017 that describes (e.g., summarizes a theme/scenario of) the image 201.

In some implementations, referring to FIG. 2A, the image representation 2011 representing image content of the image 201, the text representation 2031 representing semantic content of the user input 203, the first chat history 241, and/or metadata 260 associated with the image 201, can be processed as input, using the generative model 193, to generate the model output 271. The metadata 260 can include, for instance, the first text 2013 that includes characters recognized from the image 201, the second text 2015 that includes names (or other identifiers) of object(s) recognized from the image 201, and/or the third text 2017 that describes the image 201, etc.

In various implementations, the image representation 2011 can be stored in a database 1291 that is associated with a chat history, or that is associated with a registered account (e.g., of user R) for the virtual assistant 140, etc. For instance, an entry can be created in the database 1291 to store an identifier of the image 201 and the image representation 2011 (e.g., image tokens in the form of numerical vectors) of the image 201. Optionally, the entry for the image 201 can include the aforementioned metadata 260 for the image 201. As described above, the metadata 260 can include, for instance, the first text 2013 that includes characters recognized from the image 201, the second text 2015 that includes names (or other identifiers) of object(s) recognized from the image 201, and/or the third text 2017 that describes the image 201.

In various implementations, referring to FIG. 2A, an additional user input 205 can be received from the user R (or another user) relating to the image 201. The additional user input 205 can be, for instance, "What's the instrument used in both step (c) and step (d)?" In response to receiving the additional user input 205, a text representation 2051 for the additional user input 205 can be generated, and/or a text representation of a second chat history 243 preceding the additional user input 205 can be generated. In response to receiving the additional user input 205, the image representation 2011 representing the image 201 can be retrieved from the database 1291 (e.g., based on the second chat history 243).

The text representation 2051 for the additional user input 205 (e.g., "What's the instrument used in both step (c) and step (d)?"), the text representation of the second chat history 243 (that is generated by updating the first chat history 241 to include the additional user input 205), the image representation 2011 representing the image 201, and/or the metadata 260 can be processed, using the generative model 193, to generate an model output 273 from which a second response 213 responsive to the additional user input 205 is derived. The second response 213, referring to FIG. 2E, can be, for instance, "Volumetric flask, often used for measuring accurate volumes of liquid materials for laboratory experiments. They are more accurate than graduated cylinders and beakers."

In some implementations, optionally, in response to receiving the user input 203, the virtual assistant can identify the image 201 and determine whether the image 201 occurs for a first time during the multi-turn dialog between the user R and the virtual assistant 140. For instance, the virtual assistant 140 can determine, based on scanning the first chat history 241 including previous user input (if any) and/or virtual assistant input/response (if any) that precede the user input 203, whether the image 201 occurs for a first time during the multi-turn dialog between the user R and the virtual assistant 140. In response to determining that the image 201 occurs for a first time during the multi-turn dialog, the system can index the image 201, generate and cache a tokenized representation of the image 201 as depicted in FIG. 2A, and generate the first response 211 using the tokenized representation of the image 201 (as described above).

In response to determining that the image 201 is not an image occurred for the first time in the multi-turn dialog, the tracking engine 145 can retrieve the image tokens of the image 201 (e.g., from the database 1291), e.g., using the structured file of the first chat history 241.

In some implementations, the generative model 193 can have more than 100 billion parameters, or over 200 billion parameters, etc. In some implementations, the generative model 193 may be stored locally at the client computing device of the user. In some implementations, the generative model 193 can be stored remotely at a server computing device. In some implementations, the generative model 193 can be both at the server computing device and the client computing device.

In some implementations, the generative model 193 may be trained using enormous amounts of data collected from diverse sources such as webpages, electronic books, software code, electronic news articles, and machine translation data, images, image-text pairs. In some implementations, the generative model 193 can be fine-tuned using one or more training instances (e.g., 180A in FIG. 2A). The one or more training instances can include a first training instance, where the first training instance can include a first training instance input that include a portion of a multi-turn conversation (or a text representation thereof), where the portion of the multi-turn conversation includes an image, a first user input querying about the image, a first response to the first user input, and a second user input (different from the first user input) querying about the image. The first training instance input can, optionally, include image facts of the image, where the image facts of the image can include (but is not limited to) one or more characters/words extracted from the image, one or more objects detected within the image, and/or an image caption determined for the image. The one or more characters/words can be extracted from the image, e.g., using an optical character recognition model. The one or more objects within the image can be detected, e.g., using an object detection/classification model. The image caption can be generated, e.g., using an image captioning model. The first training instance can further include a first ground truth output including a second response responsive to the second user input.

For instance, the first training instance input can be processed as input, using the generative model, to generate a first model output from which a first training instance output is derived. Parameters of the generative model can be fine-tuned based on comparing the first training instance output with the first ground truth output.

It is noted that, while FIGS. 2A-2E are illustrated to show presence of only one image in a dialogue, the dialogue can include more than one image and/or other visual content, where tokenized representations for each of the more than one image and/or other visual content are generated and cached the first time an image (or other visual content) occurred in the dialogue. For instance, the dialogue can include a first image occurred for the first time during a $N^{th}$ turn (e.g., a user turn/input) of the dialogue, and a second video occurred for the first time during a $M^{th}$ turn (e.g., a virtual assistant input/turn) of the dialogue. In this case, a tokenized representation of the first image can be generated and cached in response to detecting the first image occurring for the first time in the dialogue. A tokenized representation of the second video can be generated and cached in response to detecting the second video occurring for the first time in the dialogue. The tokenized representation of the first image and/or the tokenized representation of the second video can be cached, for instance, in a database specific to the dialogue between the user and the virtual assistant. Subsequently, if an additional user input is received and determined as being directed to the second video, the tokenized representation of the second video can be retrieved from the database specific to the dialogue (e.g., using a video marker for the second video), without re-computing pixels of each frame for the second video to re-generate the tokenized representation of the second video. This not only saves computational resources needed to perform the re-computing, but also reduces a latency in generating a response to the additional user input.

Figure 3A:
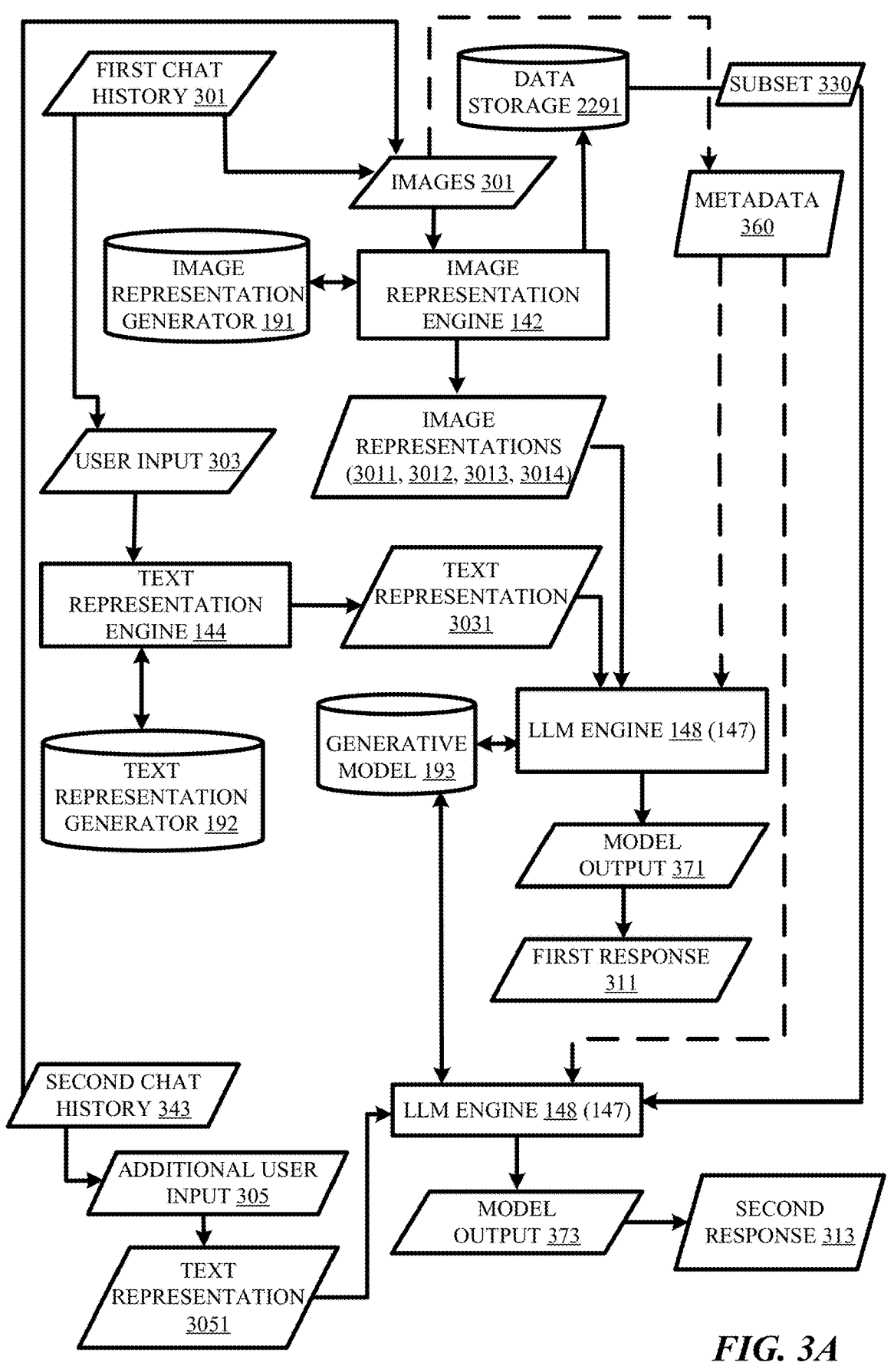
FIG. 3A illustrates another example scenario where responses to user queries directed to images are generated using techniques described in accordance with various implementations of the present disclosure.
Figure 3B:
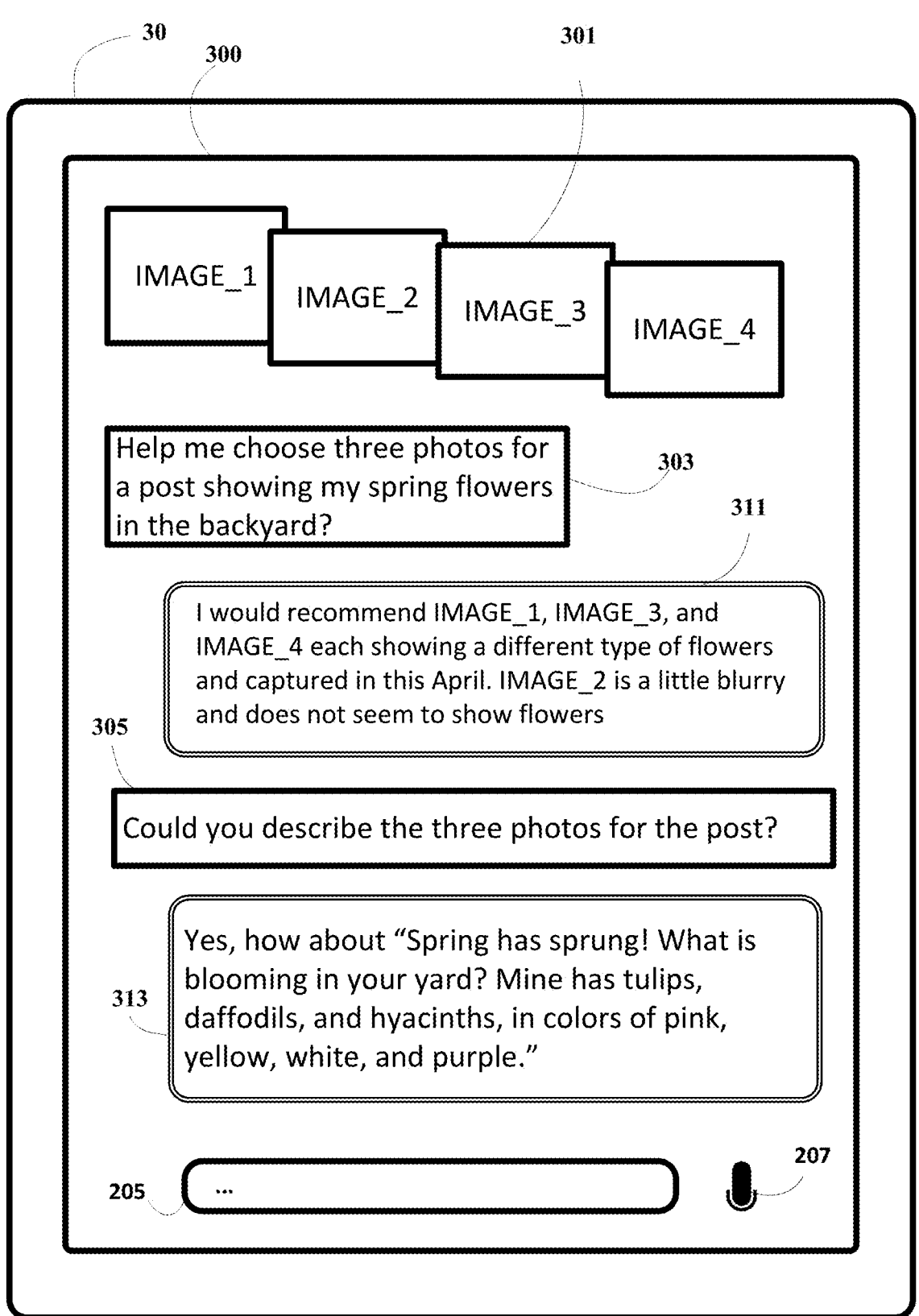
FIG. 3B illustrates an example of a user interface of a virtual assistant showing a multi-turn conversation, in accordance with various implementations of the present disclosure.

FIG. 3A illustrates another example scenario where responses to user queries directed to images are generated using techniques described in accordance with various implementations of the present disclosure. FIG. 3B illustrates an example of a user interface of a virtual assistant showing a multi-turn conversation, in accordance with various implementations of the present disclosure.

As shown in FIG. 3A, a user input 303 from a user R relating to a plurality of images 301 (e.g., IMAGE_1, IMAGE_2, IMAGE_3, IMAGE_4, etc.) can be received, e.g., via an user interface 300 of the virtual assistant 140 (or a chat application, etc.) that enables a multi-turn human-to-computer dialog between the user R and the virtual assistant 140. As a second working example, referring to FIG. 3B, the user input 303 can be, for instance, "Help me choose three photos for a post showing my spring flowers in the backyard", which is related to the plurality of images 301.

Referring back to FIG. 3A, in response to receiving the user input 303 relating to the plurality of images 301, the plurality of images 301 can be processed, respectively, using the image representation generator 191, to generate a plurality of image representations (3011, 3012, 3013, 3014, etc.) each representing image content of a corresponding image from the plurality of images 301. In some implementations, in response to receiving the user input 303, the user input 303 can be processed, using the text representation generator 192, to generate a text representation 3031 representing semantic content of the user input 303.

Optionally, the plurality of images 301 can each be processed, respectively, using an OCR model, to generate a first set of texts each including characters recognized from a corresponding image from the plurality of images 301.

Optionally, the plurality of images 301 can be processed, respectively, using an object detection/classification model, to generate a second set of texts each including names (or other identifiers) of object(s) recognized from a corresponding image from the plurality of images 301.

Optionally, the plurality of images 301 can be processed, respectively, using an image captioning model, to generate a third set of texts each describing a corresponding image of the plurality of images 301.

In some implementations, the image representations (e.g., 3011, 3012, 3013, 3014) representing image content of the plurality of images 301 and the text representation 3031 representing semantic content of the user input 303 can be processed as input, using a generative model 193, to generate a model output 371 from which a first response 311 responsive to the user query 303 is derived. In the second working example above where the user query 303 is "Help me choose", the first response 311 can be, for instance, "I would recommend IMAGE_1, IMAGE_3, and IMAGE_4 each showing a different type of flowers and captured in this April. IMAGE_2 is a little blurry and does not seem to show flowers".

In some implementations, the plurality of image representations (e.g., 3011, 3012, 3013, 3014), the text representation 3031, and metadata 360 (which can include the first set of texts, the second set of texts, and/or the third set of texts) can be processed as input, using the generative model 193, to generate a model output 371 from which the first response 311 responsive to the user query 303 is derived.

In various implementations, the plurality of image representations can be stored in a database 2291 (also referred to as "data storage 2291") that is associated with a first chat history 301 (including the images 301 and the user input 303) or is associated with a registered account (e.g., of user R) for the virtual assistant 140. For instance, an entry can be created in the database 2291 to store an identifier for each of the plurality of images 301 and a corresponding image representation of a respective image, from the plurality of images 301. Optionally, the entry for the respective image can include associated metadata for the respective image. The metadata can include, for instance, a text that includes characters recognized from the respective image, a text that includes names (or other identifiers) of object(s) recognized from the respective image, and/or a text that describes the respective image, etc., as described previously.

In various implementations, referring to FIG. 3A, an additional user input 305 can be received from the user R (or another user) relating to a subset of images from the plurality of images 301. The additional user input 305 can be, for instance, "Could you describe the three photos for use as content of the post?" In response to receiving the additional user input 305, a text representation 3051 for the additional user input 305 can be generated, or a text representation of a second chat history 343 (or of the structured file of the second chat history 343) that includes the additional user input 305 and the images 301 can be generated. In response to receiving the additional user input 305, images (e.g., IMAGE_1, IMAGE_3, and IMAGE_4) that correspond to a key term (e.g., "the three photos") in the additional user input 305 can be identified. Correspondingly, the image representations representing the three selected images (e.g., IMAGE_1, IMAGE_3, and IMAGE_4, labeled as "subset 330" in FIG. 3A) can be retrieved from the database 2291.

The text representation 3051 for the additional user input 305 (e.g., "Could you describe the three photos for use as content of the post?"), the text representation of the second chat history 343, the image representations representing the three selected images (e.g., IMAGE_1, IMAGE_3, and IMAGE_4), and/or a portion of the metadata 360 that correspond to the subset 330 (e.g., the three selected images of IMAGE_1, IMAGE_3, and IMAGE_4) can be processed, using the generative model 193, to generate an model output 373 from which a second response 313 responsive to the additional user query 305 is derived. The second response 313, referring to FIG. 3B, can be, for instance, "Yes, how about 'Spring has sprung!What is blooming in your yard-?Mine has tulips, daffodils, and hyacinths, in colors of pink, yellow, white, and purple.'"

By identifying image(s) having tokenized representation(s) (e.g., image tokens) cached in the database 2291 and retrieving the tokenized representation(s) in response to the additional user input 305, computational resources associated with re-computing the tokenized representation(s) can be saved and latency in formulating the second response 313 can be reduced. In some implementations, the database 2291 and the generative model 193 can be stored at a same device (e.g., server computing device 12 in case a generative model with more parameters and greater computational capability is needed) to further reduce the latency in formulating the second response 313, and to save network resources associated with transmitting data associated with the tokenized representation of images (e.g., IMAGE_1, IMAGE_3, IMAGE_4).

Figure 4:
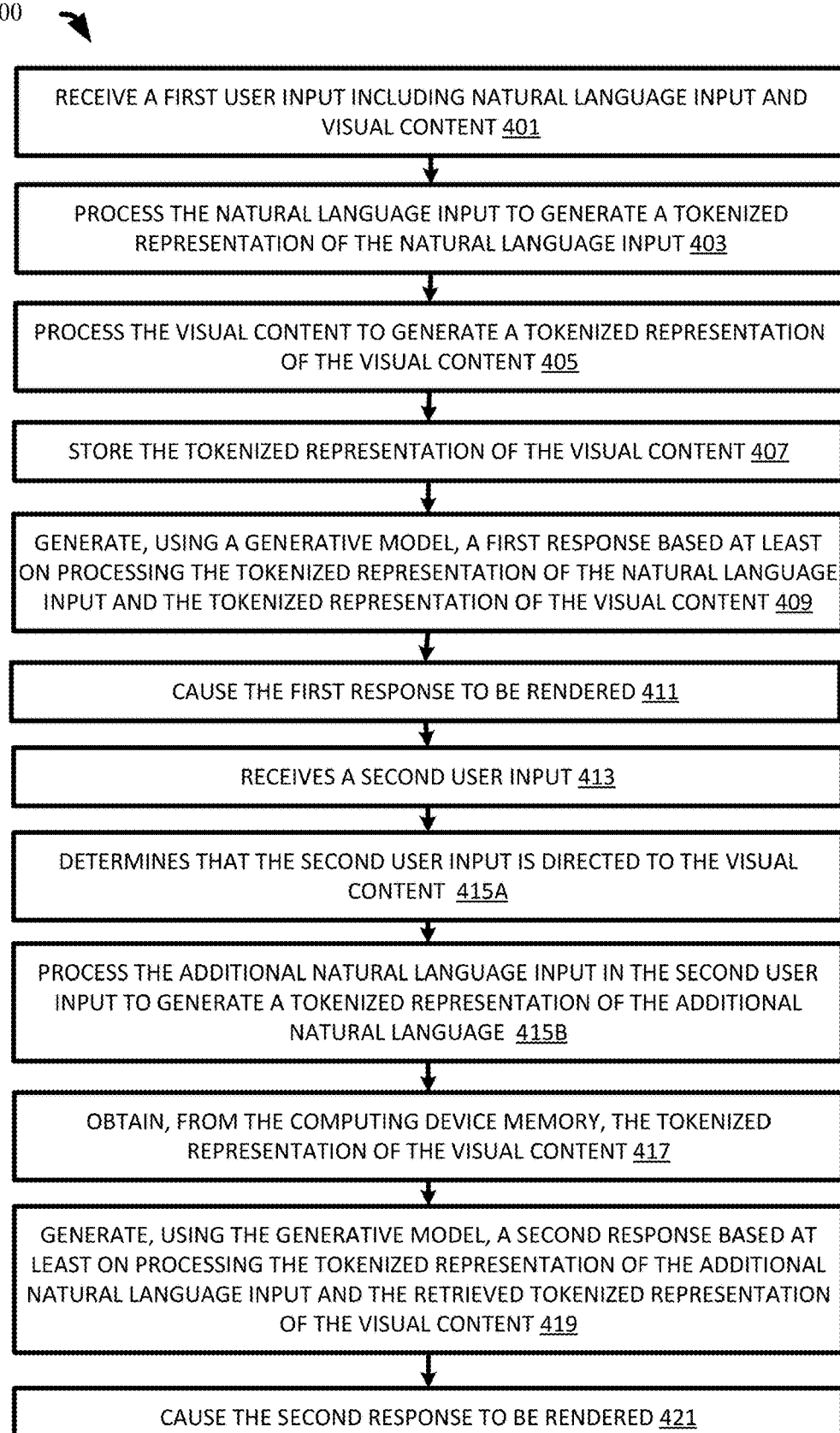
FIG. 4 depicts an example of a method for responding to user queries relating to an image in a multi-turn conversation, in accordance with various aspects of the present disclosure.

FIG. 4 depicts an example of a method for responding to user queries relating to visual content (e.g., an image, a video, a 3D point cloud, etc.) in a multi-turn conversation, in accordance with various aspects of the present disclosure. A system for performing the method 400A includes one or more processors, memory, and/or other component(s) of computing device(s) (e.g., client computing device 10 of FIG. 1A, one or more servers, and/or other computing devices). Moreover, while operations of the method 400A are shown in a particular order, this is not meant to be limiting. One or more operations may be reordered, omitted, and/or added.

In various implementations, at block 401, the system receives a first user input, where the first user input includes natural language input and/or visual content. The natural language input, for instance, can be a natural language query (e.g., "Is this painting a pop art style?") directed to the visual content (e.g., a particular painting a user of the first user input comes across from the Internet, or other types of visual content).

In various implementations, at block 403, the system processes the natural language input to generate a tokenized representation (also referred to as "first text representation") of the natural language input.

In various implementations, at block 405, the system processes the visual content to generate a tokenized representation (also referred to as "an image representation") of the visual content that is derived from pixels of the visual content to represent the visual content numerically).

In various implementations, at block 407, the system stores the tokenized representation of the visual content in computing device memory (e.g., a database associated with a chat that includes the first user input). In some implementations, the system can determine whether the visual content occurs for the first time during the multi-turn conversation, and the system stores the tokenized representation of the visual content in computing device memory in response to determining that the visual content occurs for the first time during the multi-turn conversation. In case the system determines that the visual content occurs previously in the multi-turn conversation, the blocks 405 & 407 can be omitted and the system can retrieve the tokenized representation of the visual content from the computing device memory, as the system can be configured to generate tokenized representations for each of multiple instances of visual content that has occurred for the first time in separate turns of the multi-turn conversation.

In some implementations, the computing device memory can be included in a remote server (e.g., 12 in FIG. 1A) to accommodate a generative model having more parameters and therefore requires more storage space and to reduce the network resources associated with transmission of the tokenized representation of visual content. In some other implementations, the computing device memory can be included in a local device that enables the multi-turn conversation, for instance, to ensure more safety of data associated with a user of the virtual assistant and to reduce the latency caused by data transmission of a generated response form a server device to the local device. In some other implementations, the tokenized representation of the visual content and the generative model, however, may not be stored at the same device, and the present disclosure is not limited thereto.

In various implementations, at block 409, the system generates, using a generative model, a first response responsive to the first user input based at least on processing the tokenized representation of the natural language input and the tokenized representation representing the visual content. In some implementations, the computing device memory storing the tokenized representation of the visual content can further store the generative model, to reduce consumption of network resources associated with data transmission (e.g., that transmits the tokenized representation from one device to another) and a latency in generating the first response.

In various implementations, at block 411, the system causes the first response to be rendered in response to the first user input. For instance, given the first user input being a query of "Is this painting a pop art style?" (which is directed to a particular painting showing two lines of soup cans painted with different colors such as red, yellow, and blue), the first response can be, "likely yes, since the painting uses the bold colors of red, yellow and blue, and depicts soup cans commonly seen in pop art."

In various implementations, optionally, at block 413, the system receives a second user input. The second user input is different from the first user input, and includes an additional natural language input.

In various implementations, at block 415, the system determines that the second user input is directed to the visual content in block 401 (block 415A) and processes the additional natural language input in the second user input to generate a tokenized representation of the additional natural language input (415B).

In various implementations, at block 417, the system obtains, from the computing device memory, the tokenized representation of the visual content, in response to determining that the second user input is directed to the visual content.

In various implementations, at block 419, the system processes the tokenized representation of the additional natural language input and the tokenized representation representing the visual content, using the generative model, to generate a second response that is responsive to the second user input.

In various implementations, at block 421, the system causes the second response to be rendered in response to the second user input.

Figure 5:
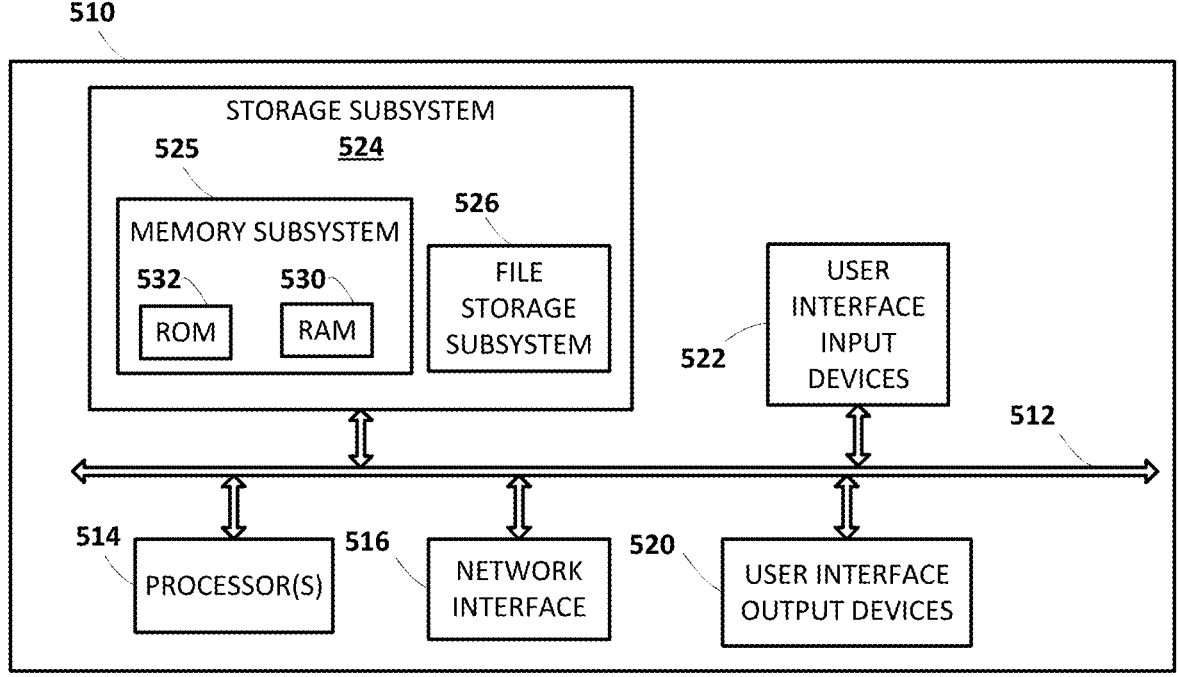
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1A.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

What is claimed is:

1. A method implemented using one or more processors, the method comprising:

receiving a first user input, the first user input including natural language input and visual content;

processing the natural language input, included in the first user input, to generate a tokenized representation of the natural language input;

processing the visual content, included in the first user input, to generate a tokenized representation of the visual content;

storing, in computing device memory, the tokenized representation of the visual content;

processing, using a generative model that is also stored in the computing device memory, at least the tokenized representation of the natural language input and the tokenized representation of the visual content to generate a first response that is responsive to the first user input;

causing the first response to be rendered in response to the first user input;

receiving a second user input, the second user input being different from the first user input, and the second user input including at least additional natural language input;

determining that the additional natural language input is directed to the visual content;

processing additional natural language content, included in the second user input, to generate a corresponding tokenized representation of the additional natural language input;

obtaining, from the computing device memory, the corresponding tokenized representation of the visual content;

processing, using the generative model that is also stored in the computing device memory, at least the tokenized representation of the additional natural language input and the tokenized representation of the visual content to generate a second response that is responsive to the second user input;

causing the second response to be rendered in response to the second user input.

2. The method of claim 1, wherein processing at least the tokenized representation of the natural language input and the tokenized representation of the visual content to generate the first response comprises:

processing the tokenized representation of the natural language input, the tokenized representation of the visual content, and one or more descriptions of the visual content to generate the first response.

3. The method of claim 2, wherein the one or more descriptions of the visual content includes a first description describing one or more words or characters recognized from the visual content.

4. The method of claim 2, wherein the one or more descriptions of the visual content includes a second description describing one or more objects recognized from the visual content.

5. The method of claim 4, wherein the second description further includes one or more search results performed based on the one or more objects recognized from the visual content.

6. The method of claim 2, wherein the one or more descriptions of the visual content includes a third description describing a scene depicted in the visual content, the third description being generated based on processing the visual content using an image understanding model.

7. The method of claim 6, wherein the image understanding model is a visual language model, or an image captioning model.

8. The method of claim 1, wherein processing at least the tokenized representation of the natural language input and the tokenized representation of the visual content to generate the first response comprises:

processing metadata associated with a chat history that includes the first user input to generate the first response, wherein the metadata associated with the chat history further includes the tokenized representation of the visual content or information to retrieve the tokenized representation of the visual content.

9. The method of claim 8, wherein the metadata associated with the chat history includes a system message that includes a visual content marker for retrieving the visual content.

10. A method implemented using one or more processors, the method comprising:

receiving, from a user and during a multi-turn human-to-computer dialog between the user and a virtual assistant, user input, the user input including natural language input that is related to visual content, the visual content being previously present in the multi-turn human-to-computer dialog and being previously processed to generate a tokenized representation of the visual content, and the tokenized representation of the visual content being stored in a database associated with the multi-turn human-to-computer dialog;

in response to receiving the user input:

processing the natural language input, included in the user input, to generate a tokenized representation of the natural language input, retrieving the tokenized representation of the visual content, and without re-computing the tokenized representation of the visual content, generating, using a generative model, a response responsive to the user input based at least on processing the tokenized representation of the natural language input and the retrieved tokenized representation of the visual content, and causing the response to be rendered in response to the user input.

11. The method of claim 10, wherein generating the response responsive to the user input based at least on processing the tokenized representation of the natural language input and the tokenized representation of the visual content comprises:

generating the response responsive to the user input based on processing the tokenized representation of the natural language input, the tokenized representation of the visual content, and one or more descriptions of the visual content.

12. The method of claim 11, wherein the one or more descriptions of the visual content includes a first description describing one or more words or characters extracted from the visual content.

13. The method of claim 12, wherein the first description describing one or more words or characters extracted from the visual content is generated based on processing the visual content using an optical character recognition model.

14. The method of claim 11, wherein the one or more descriptions of the visual content includes a second description describing one or more objects recognized from the visual content.

15. The method of claim 14, wherein the second description describing the one or more objects recognized from the visual content is generated based on processing the visual content using an object recognition and classification model.

16. The method of claim 15, wherein the second description further includes one or more search results performed based on the one or more objects recognized from the visual content.

17. The method of claim 11, wherein the one or more descriptions of the visual content includes a third description describing a scene depicted in the visual content, the third description being generated based on processing the visual content using an image understanding model.

18. A method implemented using one or more processors, the method comprising:

receiving, from a user and during a human-to-computer dialog between the user and a virtual assistant, a user input, the user input including natural language input;

in response to receiving the user input:

processing the natural language input, included in the user input, to generate a tokenized representation of the natural language input, and determining, based on the user input and metadata associated with a chat history of the human-to-computer dialog, whether the user input is directed to any visual content present in the chat history, wherein the metadata associated with the chat history includes one or more markers to retrieve one or more tokenized representations for respective visual content that has occurred in the human-to-computer dialog; and in response to determining that the user input is directed to first visual content that has occurred in the human-to-computer dialog, retrieving a tokenized representation of the first visual content stored in association with the human-to-computer dialog, and processing, using a generative model, at least the tokenized representation of the natural language input and the retrieved tokenized representation of the first visual content, to generate a response responsive to the user input; and causing the response to be rendered in response to the user input.

19. The method of claim 18, further comprising:

in response to determining that the user input is directed to second visual content that has not occurred in the human-to-computer dialog, generating a tokenized representation of the second visual content, processing, using the generative model, at least the tokenized representation of the natural language input and the generated tokenized representation of the second visual content, to generate the response responsive to the user input, and storing the tokenized representation of the second visual content in association with the human-to-computer dialog.

20. The method of claim 18, wherein the metadata associated with the chat history includes a structured file, wherein the structured file includes: a system message having a first marker to retrieve the tokenized representation of the first visual content, and a user input entry that stores the user input.

* * * * *